(12) United States Patent
Schossmann et al.

(10) Patent No.: US 11,788,910 B2
(45) Date of Patent: Oct. 17, 2023

(54) ROTATIONAL AND LINEAR PARAMETER MEASUREMENTS USING A QUADRATURE CONTINUOUS WAVE RADAR WITH MILLIMETER WAVE METAMATERIALS AND FREQUENCY MULTIPLEXING IN METAMATERIAL-BASED SENSORS

(71) Applicant: Infineon Technologies AG, Neubiberg (DE)

(72) Inventors: Alexander Schossmann, Graz (AT); Alexander Bergmann, Graz (AT); Dirk Hammerschmidt, Finkenstein (AT); Christof Michenthaler, Feistritz/Gail (AT)

(73) Assignee: Infineon Technologies AG, Neubiberg (DE)

( * ) Notice: Subject to any disclaimer, the term of this patent is extended or adjusted under 35 U.S.C. 154(b) by 117 days.

(21) Appl. No.: 17/518,912

(22) Filed: Nov. 4, 2021

(65) Prior Publication Data
US 2023/0140391 A1    May 4, 2023

(51) Int. Cl.
| | |
|---|---|
| *G01L 5/22* | (2006.01) |
| *G01D 5/14* | (2006.01) |
| *B62D 6/10* | (2006.01) |
| *H04W 4/38* | (2018.01) |

(52) U.S. Cl.
CPC ............... *G01L 5/221* (2013.01); *B62D 6/10* (2013.01); *G01D 5/145* (2013.01); *H04W 4/38* (2018.02)

(58) Field of Classification Search
CPC ............ G01L 5/221; H04W 4/38; B62D 6/10; G01D 5/145
See application file for complete search history.

(56) References Cited

U.S. PATENT DOCUMENTS

2019/0376858 A1* 12/2019 Hammerschmidt ...... G01L 3/00

OTHER PUBLICATIONS

Zhao et al. "Voltage-tunable dual-layer terahertz metamaterials." Microsystems & Nanoengineering, Jul. 4, 2016, doi:10.1038/micronano.2016.25.
Fedotov et al. "Sharp dark-mode resonances in planar metamaterials with broken structuralsymmetry." Feb. 1, 2008, https://arxiv.org/pdf/0704.1577.pdf.

(Continued)

*Primary Examiner* — Son T Le
*Assistant Examiner* — Brian Butler Geiss
(74) *Attorney, Agent, or Firm* — Harrity & Harrity, LLP

(57) ABSTRACT

A sensor system includes a first metamaterial track mechanically coupled to a rotational shaft configured to rotate about a rotational axis, wherein the first metamaterial track is arranged at least partially around the rotational axis, and wherein the first metamaterial track includes a first array of elementary structures; at least one transmitter configured to transmit a first continuous wave towards the first metamaterial track, wherein the first metamaterial track is configured to convert the first continuous wave into a first receive signal based on a rotational parameter of the rotational shaft; and at least one quadrature continuous-wave receiver configured to receive the first receive signal, acquire a first measurement of a first property of the first receive signal, and determine a measurement value for the rotational parameter of the rotational shaft based on the first measurement.

24 Claims, 18 Drawing Sheets

(56) References Cited

OTHER PUBLICATIONS

Fedotov et al. "Sharp Trapped-Mode Resonances in Planar Metamaterials with a Broken Structural Symmetry." The American Physical Society, Oct. 2, 2007, DOI: 10.1103/PhysRevLett.99.147401.
Lapine et al. "Structural tunability in metamaterials." American Institute of Physics, Aug. 27, 2009, DOI: 10.1063/1.3211920.
Zhao et al. "Integrating microsystems with metamaterials towards metadevices." Microsystems & Nanoengineering, Jan. 28, 2019, https://doi.org/10.1038/s41378-018-0042-1.

* cited by examiner

ROTATIONAL AND LINEAR PARAMETER MEASUREMENTS USING A QUADRATURE CONTINUOUS WAVE RADAR WITH MILLIMETER WAVE METAMATERIALS AND FREQUENCY MULTIPLEXING IN METAMATERIAL-BASED SENSORS

BACKGROUND

Vehicles feature numerous safety, body, and powertrain applications that rely on speed sensing, position sensing, and/or angle sensing. For example, in a vehicle's Electronic Stability Program (EPS), magnetic angle sensors and linear Hall sensors can be used to measure steering angle and steering torque. Modern powertrain systems can rely on magnetic speed sensors for camshaft, crankshaft and transmission applications, along with automotive pressure sensors, to achieve required $CO_2$ targets and smart powertrain solutions. However, a disadvantage of known solutions is that they are sensitive to magnetic disturbances.

Magnetic disturbance fields are prevalent in vehicles such that magnetic angle-measurements often have to endure harsh environments. This is especially problematic in hybrid and electric vehicles, where many wires with high currents are located near the sensor system. Thus, external magnetic disturbance fields may be generated by current-rails in a vehicle that influence the accuracy of the magnetic angle measurements. Thus, sensors that are robust against electromagnetic stray fields may be desirable.

Additionally, multiple sensors are typically required to measure multiple measurement parameters, such as movement speed (rotational or linear), movement direction, position, rotation angle, torque, and the like. Thus, a sensor capable of performing measurements on multiple measurement parameters, including performing those measurements in parallel may be desirable.

This sensor systems may require an elaborate solution for signal transmission and analysis, especially at the correspondingly high frequencies in the millimeter (mm)-wave regime. Available frequency-modulated continuous-wave (FMCW) chips have the disadvantage of requiring a large chirp bandwidth for small distance measurements. Further, their sampling rate is limited by the chirp duration. Available continuous-wave doppler radar chips are not suitable for measuring signals from non-moving objects and thus do not allow measurement of starting torque. Accordingly, a sensor that can provide a robust, low power, and low-cost system for metamaterial-based mm-wave static or dynamic measurements, including torque, using a quadrature continuous-wave (QCW) radar may be desirable. QCW radar is scalable over a broad range of working frequencies, from a few GHz to several hundred GHz.

SUMMARY

One or embodiments provide a sensor system, including: a first metamaterial track mechanically coupled to a rotational shaft configured to rotate about a rotational axis, wherein the first metamaterial track is arranged at least partially around the rotational axis, and wherein the first metamaterial track includes a first array of elementary structures; at least one transmitter configured to transmit a first continuous wave towards the first metamaterial track, wherein the first metamaterial track is configured to convert the first continuous wave into a first receive signal based on a rotational parameter of the rotational shaft; and at least one quadrature continuous-wave receiver configured to receive the first receive signal, acquire a first measurement of a first property of the first receive signal, and determine a measurement value for the rotational parameter of the rotational shaft based on the first measurement.

One or more embodiments provide a method of determining a rotational parameter of a rotatable shaft. The method includes transmitting a first continuous wave towards a first metamaterial track mechanically coupled to the rotatable shaft; converting, by the first metamaterial track, the first continuous wave into a first receive signal based on a real-time value of the rotational parameter; receiving, by a quadrature continuous-wave receiver, the first receive signal; acquiring, by the quadrature continuous-wave receiver, a first measurement of a first property of the first receive signal; and determining, by the quadrature continuous-wave receiver, determine the real-time value of the rotational parameter of the rotational shaft based on the first measurement.

One or embodiments provide a rotation sensor system, including: a rotational shaft configured to rotate about a rotational axis; a first array of millimeter-wave (mm-wave) structures mechanically coupled to the rotational shaft, wherein the first array of mm-wave structures is arranged at least partially around the rotational axis, and wherein the first array of mm-wave structures has a first working resonance frequency; a second array of mm-wave structures mechanically coupled to the rotational shaft, wherein the second array of mm-wave structures is arranged at least partially around the rotational axis, and wherein the second array of mm-wave structures has a second working resonance frequency that is different from the first working resonance frequency; at least one transmitter configured to transmit a first electro-magnetic transmit signal towards the first array of mm-wave structures and transmit a second electro-magnetic transmit signal towards the second array of mm-wave structures, wherein the first array of mm-wave structures is configured to convert the first electro-magnetic transmit signal into a first electro-magnetic receive signal, wherein the second array of mm-wave structures is configured to convert the second electro-magnetic transmit signal into a second electro-magnetic receive signal; and at least one receiver configured to receive the first electro-magnetic receive signal and the second electro-magnetic receive signal, determine a first rotational parameter of the rotational shaft based on the first electro-magnetic receive signal, and determine a second rotational parameter of the rotational shaft based on the second electro-magnetic receive signal, wherein the first rotational parameter and the second rotational parameter are different rotational parameters.

One or embodiments provide a rotation sensor system, including: a rotational shaft configured to rotate about a rotational axis; a first array of millimeter-wave (mm-wave) structures mechanically coupled to the rotational shaft, wherein the first array of mm-wave structures is arranged at least partially around the rotational axis, and wherein the first array of mm-wave structures has a first working resonance frequency; a second array of mm-wave structures mechanically coupled to the rotational shaft, wherein the second array of mm-wave structures is arranged at least partially around the rotational axis, and wherein the second array of mm-wave structures has a second working resonance frequency that is different from the first working resonance frequency; a transmitter configured to transmit an electro-magnetic transmit signal towards the first array of mm-wave structures and the second array of mm-wave structures, wherein the first array of mm-wave structures is configured to convert the electro-magnetic transmit signal into a first electro-magnetic receive signal and the second array of mm-wave structures is configured to convert the electro-magnetic transmit signal into a second electro-magnetic receive signal; and at least one receiver configured to receive the first electro-magnetic receive signal and the second electro-magnetic receive signal, determine a first rotational parameter of the rotational shaft based on the first electro-magnetic receive signal, and determine a second rotational parameter of the rotational shaft based on the second electro-magnetic receive signal, wherein the first rotational parameter and the second rotational parameter are different rotational parameters.

One or embodiments provide a linear movement sensor system, including: a linear movable target object configured to move linearly in a linear moving direction; a first array of millimeter-wave (mm-wave) structures coupled to the linear movable target object, wherein the first array of mm-wave structures extends along the linear moving direction, and wherein the first array of mm-wave structures has a first working resonance frequency; a second array of mm-wave structures coupled to the linear movable target object, wherein the second array of mm-wave structures extends along the linear moving direction, and wherein the second array of mm-wave structures has a second working resonance frequency that is different from the first working resonance frequency; at least one transmitter configured to transmit at least one electro-magnetic transmit signal towards the first array of mm-wave structures and the second array of mm-wave structures, wherein the first array of mm-wave structures is configured to convert one of the at least one electro-magnetic transmit signal into a first electro-magnetic receive signal and the second array of mm-wave structures is configured to convert one of the at least one electro-magnetic transmit signal into a second electro-magnetic receive signal; and at least one receiver configured to receive the first and the second electro-magnetic receive signals, determine a first linear movement parameter of the linear movable target object based on the first electro-magnetic receive signal, and determine a second linear movement parameter of the linear movable target object based on the second electro-magnetic receive signal, wherein the first linear movement parameter and the second linear movement parameter are different linear movement parameters.

BRIEF DESCRIPTION OF THE DRAWINGS

Embodiments are described herein making reference to the appended drawings.

DETAILED DESCRIPTION

Figure 1:
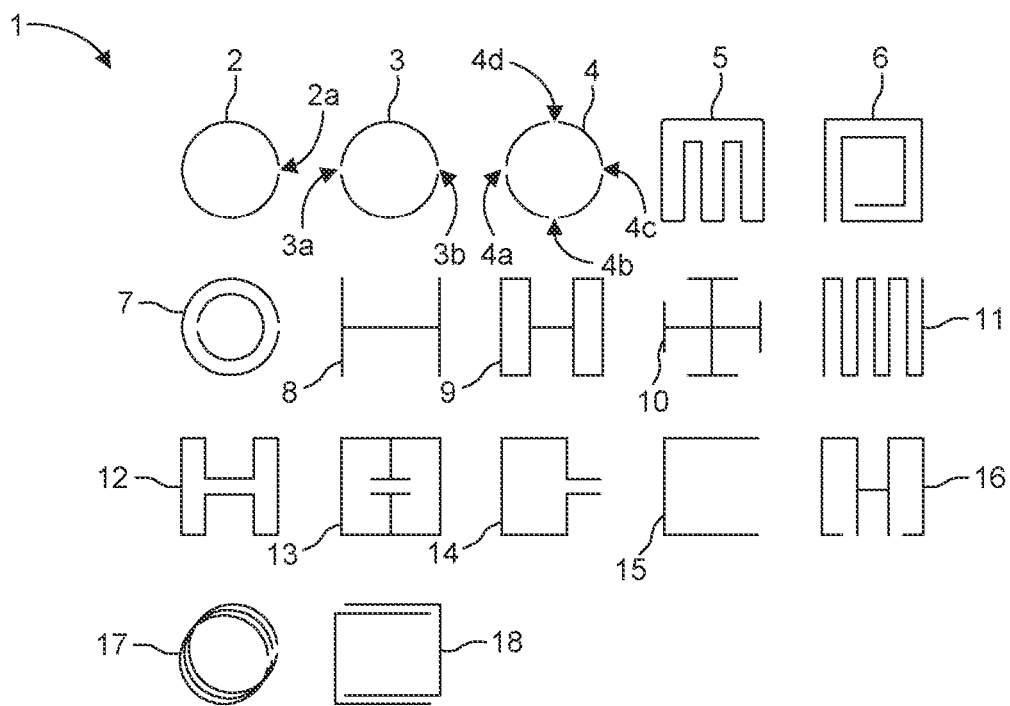
FIG. 1 illustrates a plurality of possible elementary structures according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration. It is to be understood that other embodiments may be utilized and structural or logical changes may be made without departing from the scope defined by the claims. The following detailed description, therefore, is not to be taken in a limiting sense. Directional terminology used in the claims may aid in defining one element's spatial or positional relation to another element or feature, without being limited to a specific orientation.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The terms "substantially" and "approximately" may be used herein to account for small manufacturing tolerances (e.g., within 5%) that are deemed acceptable in the industry without departing from the aspects of the embodiments described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a CD-ROM, DVD, Blu-ray disc, a RAM, a ROM, a PROM, an EPROM, an EEPROM, a FLASH memory, or an electronic memory device.

One or more elements of the present disclosure may be configured by implementing dedicated hardware or a software program on a memory controlling a processor to perform the functions of any of the components or combinations thereof. Any of the components may be implemented as a central processing unit (CPU) or other processor reading and executing a software program from a recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPGAs), programmable logic controller (PLC), or other equivalent integrated or discrete logic circuitry.

Accordingly, the term "processor," as used herein refers to any of the foregoing structures or any other structure suitable for implementation of the techniques described herein.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (i.e., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

It will be appreciated that the terms "sensor", "sensor element", and "sensing element" may be used interchangeably throughout this description, and the terms "sensor signal" and "measurement signal" may also be used interchangeably throughout this description.

Embodiments are discussed below in the context of a millimeter wave (mm-wave) sensor and mm-wave systems that include a mm-wave transmitter, a mm-wave receiver, and/or a mm-wave transceiver. Mm-waves are radio waves designated in the band of radio frequencies in the electromagnetic spectrum from 30 to 300 gigahertz (GHz) and may also be used as radar waves. Thus, a mm-wave sensor, system, transmitter, receiver, or transceiver described herein may also be regarded to as a radar sensor, system, transmitter, receiver, or transceiver, and a mm-wave may be regarded to as a radar signal. It should be noted, however, that the embodiments may also be applied in applications different from radar such as, for example, radio frequency (RF) transmitters, receivers, or transceivers of RF communication devices. In fact, any RF circuitry may take advantage of the concepts described herein. A mm-wave sensor or mm-wave system may be configured as an angle sensor, a linear position sensor, a speed sensor, a motion sensor, and the like.

A metamaterial is a material engineered to have a property that is not found in naturally occurring materials. They are made from assemblies of multiple structural elements fashioned from composite materials such as metals or plastics. The materials may be arranged in repeating or periodic patterns, at scales that are smaller than the wavelengths of the phenomena they influence. In other words, metamaterials attain the desired effects by incorporating structural elements of sub-wavelength sizes, i.e., features which are actually smaller than the wavelength of the electromagnetic waves that they affect.

As a result, metamaterials derive their properties not necessarily from the properties of the base materials, but from their designed structures. Their precise shape, geometry, size, orientation, and arrangement of the structural elements gives the metamaterials their smart properties capable of manipulating electromagnetic waves: by blocking, reflecting, absorbing, enhancing, or bending waves, to achieve benefits. Thus, a metamaterial is defined as an artificial composite that gains its electrical properties from its exactingly-designed structures and their arrangement rather than inheriting them directly from which the materials it is composed.

A metamaterial may be a subset of a larger group of heterogeneous structures consisting of a base solid material and elements of a different material. The distinction of metamaterials is that they have special, sometimes anomalous, properties over a limited frequency band. For example, mm-wave metamaterials may exhibit special properties over a millimeter band, which is the band of spectrum between 30 GHz and 300 GHz noted above.

In the context of the described embodiments, a metamaterial is a two-dimensional (2D) or three-dimensional (3D) array of elementary structures, which are coupled to each other. "Elementary structures," as used herein, may be referred to as discrete structures, element structures, or a combination thereof. In some cases, the elementary structures may be referred to simply as "structures."

The overall array provides macroscopic properties, which can be designed by the used elementary structures and their coupling paths. Metamaterials are configured for different kind of waves like electromagnetic waves (e.g., optical, infrared (IR), and mm-waves) and mechanical waves (e.g., ultrasonic). The scale of the elementary structures and their grid pitch scale with the wavelength of the target frequency range.

Elementary structures in mm-wave metamaterials may include resonator-elements, antenna-elements, filter-elements, waveguide-elements, transmission line elements, or a combination of those shown in FIG. 1. The elementary structure size may range up to several wavelengths but is typically below one wavelength. They consist of parts that generate magnetic fields (e.g., conductor rings) and other parts that create electrical fields (e.g., gaps between conductors). Furthermore, they also may have elements that have electromagnetic wave properties, such as a short transmission line segment.

In general, those elementary structures electrically represent resistive-inductive-capacitive (RLC) networks. In the frequency range where they will be used in the meta material, the characteristic of their resistive, inductive, and capacitive parameters is distributed over the geometry. Since filters, resonators, transmission lines, and antennas can be differently parametrized representatives of identical structures it is often not unambiguously possible to assign a structure to a single group. Thus, it is to be understood that a structure described as resonator can also be seen as antenna or a filter depending on its use or implementation details. Furthermore, the behavior may also change with the frequency where it is operated and a structure that behaves as transmission line for one frequency may also expose a filter characteristic or create a resonance at another frequency of operation. Finally, the choice of the material impacts the behavior which means that a choice of a better conductor will emphasize a resonant behavior while a less conductive material will increase the damping and make a filter characteristic dominant.

FIG. 1 illustrates a plurality of possible elementary structures according to one or more embodiments. The elementary structures 1 include a split ring resonator 2 having one capacitor coupling 2a, a split ring resonator 3 having two capacitor couplings 3a and 3b, a split ring resonator 4 having four capacitor couplings 4a-4d, antenna structure 5, an antenna coil 6, a nested split ring resonator 7, antenna structure 8, antenna structure 9, antenna structure 10, transmission line structure 11, antenna structure 12, coupled split ring resonators 13, split ring resonator 14, partial ring or coupling structure 15, and coupled split ring resonator 16.

The transmission line structure 11 may be a damping structure or delay structure. It may be used in an alternating configuration with resonators in order to establish an attenuated or phase shifted coupling between them instead of coupling directly. Coupling to the resonators can be capacitive or galvanic. It may also extend onto a second layer, for example, with an identical structure creating a real transmission line (i.e., two parallel wires).

The partial ring or coupling structure 15 may be referred to as a partial ring structure in the context of it being half of a split ring resonator 18. In this context, the partial ring structure 15 is coupled to a second layer to form a resonator. The partial ring or coupling structure 15 may also be used as a coupling structure as in the example in FIG. 3B. In this context, it provides capacitive coupling between ring resonator elements, but will not resonate remarkably (at least at the low frequency) as the coupled split ring resonators.

Furthermore, the elementary structures can be three-dimensional as well, such as spiral coils and nested split ring resonators that are oriented into all three Cartesian coordinate directions. Furthermore, three-dimensional structures can be generated by layering two-dimensional elementary structures in a stacked arrangement. For example, two elementary structures may be layered over one another in a vertical dimension so that they overlap with each other. In this way, a vertical capacitive coupling may be achieved between the two elementary structures and may be adjusted by varying an amount of overlap in a horizontal dimension.

FIG. 1 further illustrates a stacked split ring resonator structure 17 having three split ring resonators stacked on top of each other. The stacked split ring resonator structure 17 may be formed by using three metallization layers stacked on top of each other. FIG. 1 further illustrates a split ring resonator 18 made of two half-ring structures 15 that overlap such that a vertical capacitive coupling exists between the two half-ring structures. By varying the amount of overlap, the loop size can be made larger (e.g., by decreasing the amount of overlap) or smaller (e.g., by increasing the amount of overlap), which in turn results in a lower vertical capacitive coupling or a higher vertical capacitive coupling, respectively.

In order to achieve a quasi-homogeneous macroscopic behavior, the elementary structures are arranged in arrays which typically have dimensions that are larger than a wavelength of the target frequency range and include a multitude of elementary structures in each utilized direction.

Figures 2A, 2B:
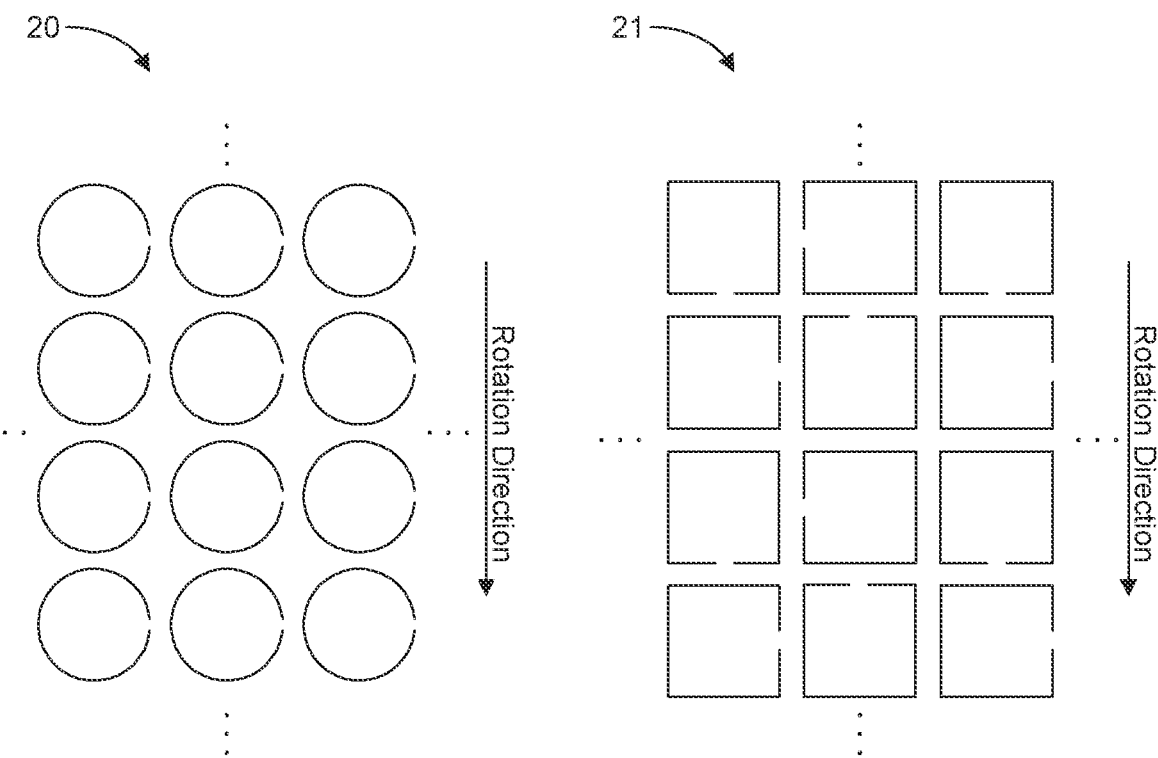
FIGS. 2A and 2B illustrate a segment of a mm-wave metamaterial track according to one or more embodiments.

FIGS. 2A and 2B illustrate a segment of a mm-wave metamaterial track according to one or more embodiments. A mm-wave metamaterial track is a stripe of mm-wave metamaterial that has multiple elementary structures arranged in both widthwise (axial) and lengthwise (rotational) dimensions. Here, the direction orthogonal to a rotation direction may be referred to as an axial direction.

Specifically, FIG. 2A shows an example of a 2D array 20 of split ring resonators, which are expected to extend further in both horizontal and rotational (circumferential) directions. However, it will be appreciated that the split ring resonators may be exchanged with any type of elementary structure, for example, with any of those shown in FIG. 1. Each split ring resonator comprises an open ring that represents an inductivity (L) and a gap or opening that provides a capacitive coupling (C). Thus, each split ring resonator is a type of LC resonator.

The elementary structures that make up the segment of a mm-wave metamaterial track shown in FIG. 2A have a fixed arrangement or fixed property along the rotation direction. For example, the split ring resonators in each row are arranged in the same position and orientation. Furthermore, the spacing between adjacent split ring resonators in the rotation direction is fixed along the track. As such, array 20 does not have any change in property of the metamaterial structures along the track in the rotation direction. One or more properties between the structures, such as spacing and orientation, may change in the axial direction as long as each row of structures has the same pattern.

There exists a mutual coupling of the structures in the array 20, which can be a capacitive coupling, an inductive coupling, or both. In this case, both types of coupling is present. For example, capacitive coupling between structures exists in the vertical direction (i.e., along the rotation direction) on the sides where rings are close together. In addition, inductive coupling between structures is provided by the field generated by each split ring resonator.

Thus, electrically, the arrangement of the elementary structures in an array introduces a mutual coupling between the elementary structures, wherein the coupling effect may utilize electric field (capacitive near field coupling), magnetic field (inductive near field coupling), waveguide coupling, or electromagnetic waves (far field coupling). Due to the dimensions of the arrays and depending on the type of used elementary structures, the coupling effect will typically made up of a mixture of all mechanisms.

The manner in which the structures are coupled affects the coupling behavior of the array or a portion of that array. In turn, this coupling behavior impacts an effect the individual structures or a group of structures have on a transmission wave or signal incident on that structure or that group of structures.

Furthermore, the coupling effect between structures is different if gaps or openings of neighboring structures are face-to-face or if the gaps face (i.e., are adjacent to) a closed segment of a neighboring structure. For example, FIG. 2B shows an example of 2D array 21 of split ring resonators in which an orientation of the split ring resonators changes in both the horizontal (width) and vertical (length) directions of the array 21 (i.e., of the metamaterial track). In other words, the location of the gap of each split ring resonator varies across neighboring structures and the rows of structures have different patterns. Here, while not required, it is possible that each row of structures has a unique pattern. As a result, the coupling effect between structures in FIG. 2B is different than the coupling effect produced by the structures shown in FIG. 2A.

Furthermore, the coupling effect between structures in FIG. 2B changes partially along the array in the rotation direction, whereas the coupling effect between structures in FIG. 2A does not change along the array in the rotation direction. The different shapes (circular versus rectangular) may also impact the characteristic of the structure itself and the coupling effect.

Each elementary structure has a size (e.g., a width or diameter) of 10% to 100% of the wavelength of a transmitted mm-wave to which the structure is sensitive. The array 20 may be a single metallization layer disposed or printed on a film such that the array 20 is two-dimensional. As noted above, it may also be possible to stack multiple metallization layers to form a 3D array.

Thus, arrays of elementary structures described herein include multiple repetitions of element structures having same or differing arrangements with respect to each other that induce a property on a transmission wave or signal incident thereon due to the coupling effect between the structures. As will be seen in FIGS. 3A-3G, at least one property changes along the array in the rotation direction which causes at least one coupling effect between elementary structures of the array to change continuously along the array in the rotation direction. This may allow, for example, to determine a rotational position change and/or a rotational angular position of the array. In contrast, for array 20, the properties are fixed along the array in the rotation direction such that the coupling effects between elementary structures of the array do not change and remain fixed along the array in the rotation direction.

As will become apparent in the following description, one or more mm-wave metamaterial tracks may also be used to perform torque measurements and/or off-axis angle measurements pertaining to a rotatable target object.

A mm-wave metamaterial track may be provided on a target object such that it forms a closed loop around an axis of rotation, thereby forming a 360° periodical pattern. In this way, a target object is a carrier structure for a mm-wave metamaterial track to be disposed. For example, the elementary structures of an array may have a 360° periodical pattern that may change continuously or in discrete steps around the circumference or along the perimeter of the metamaterial track. For example, tracks used for direct torque measurement may not have any change in property of the metamaterial structures along the track in the rotational direction, such as the case for array 20. In contrast, tracks used for angle measurement, rotational position change, rotational speed, rotational direction, or indirect torque measurement may change in property of the metamaterial structures along the track in the rotational direction, such as the case for those tracks shown in FIGS. 3A-3G. If the pattern changes, it may do so by having a periodic change along the closed-loop of the metamaterial track from 0° to 360°, and then repeat. In some cases, the pattern may change multiple times from 0° to 360°, giving multiple periodic changes along the metamaterial track. The pattern change may be made in incrementally (e.g., row-by-row) within the array of elementary structures such that the change is continuous.

There are diverse possibilities for changing a metamaterial property according to a 360° periodical pattern. It will also be appreciated that a rotational segment of less than 360° may also be applicable. For example, applications that measure limited angle ranges (e.g., throttle valve, chassis level, gas pedal) may also be used. In these cases, the target pattern need not be 360° periodic and can simply change the pattern from a minimum value to a maximum value over the used angle range (e.g., 45°, 60°, 90°, 180° etc.). It naturally follows that the target object also does not need to be a complete disc and can be reduced to a segment.

A property and/or arrangement of the metamaterial may be specific to an absolute angular position along the metamaterial track, and, thus, is also specific to an absolute angular position of the rotatable target object. An absolute angular position is an angular position relative to a predetermined (i.e., reference) angular position of the rotatable target object. For example, the reference angular position may be zero degrees, and an absolute angular position may a specific position rotated from zero degrees over a 360° period. Thus, each absolute angular position has an absolute angular value from 0° to 360°.

The following different variations may be used to change the behavior of metamaterial along the perimeter of a metamaterial track. Thus, FIGS. 3A-3G show different arrangements or patterns of elementary structures of a metamaterial according to one or more embodiments. These tracks may be used for angle measurement of a corresponding carrier substrate, a rotational position change of a corresponding carrier substrate, or an indirect torque measurement of a torque applied to a rotatable shaft.

Figure 3A:
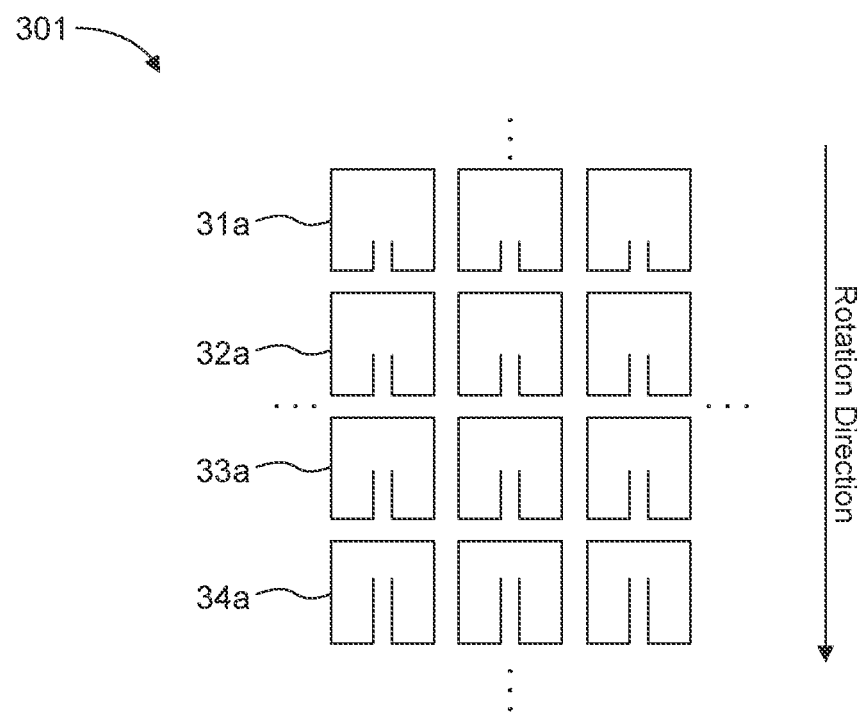
FIGS. 3A-3G show different arrangements or patterns of elementary structures of a metamaterial according to one or more embodiments.

FIG. 3A is a schematic diagram of an array of elementary structures 301 of a metamaterial track according to one or more embodiments. Here, the array includes multiple rows of split ring resonators 31a-34a in which the structures in each row have a same configuration and orientation. However, the structures in different rows have different configurations.

A 360° periodical pattern may be used to change the coupling capacitance of the split ring resonators along the rotation direction. For example, the coupling capacitance may be increased (or decreased) in the direction of rotation. Here, this is achieved by increasing (or decreasing) the length of the lines inside the opening of the split ring resonator, which results in a gradual and continuous increase (or decrease) in coupling capacitance in the rotation direction. This change in coupling capacitance along the rotation direction (i.e., along the perimeter of the metamaterial track) shifts the resonance frequency such that the change in the phase shift or the amplitude of a receive signal with respect to the transmit signal can be measured. Each phase shift value or amplitude value is specific to an absolute angular position (i.e., an angular value) of the rotatable target object.

Figure 3B:
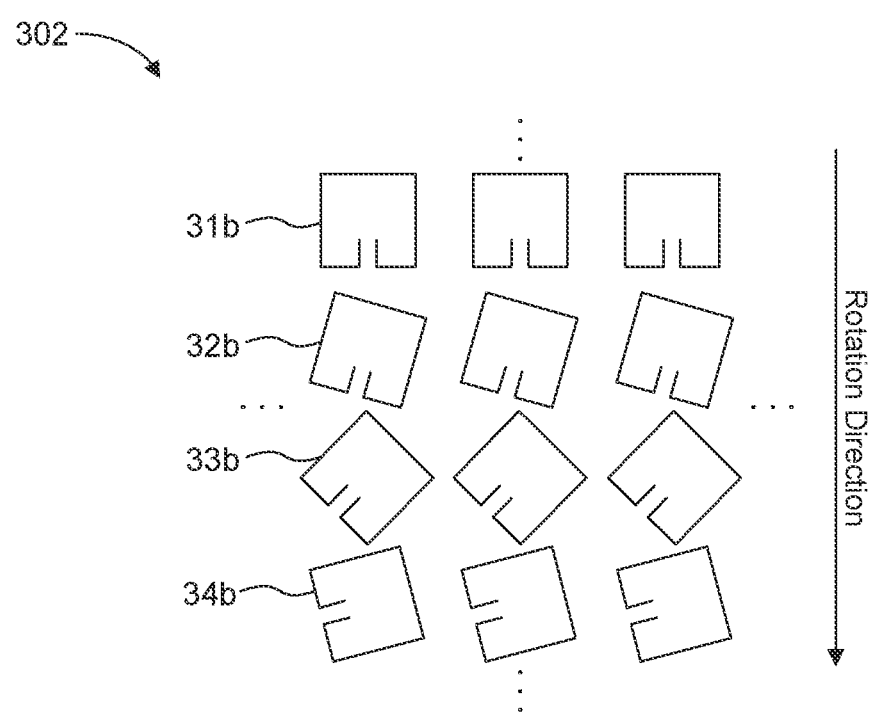

FIG. 3B is a schematic diagram of an array of elementary structures 302 of a metamaterial track according to one or more embodiments. Here, the array includes multiple rows of split ring resonators 31b-34b in which the structures in each row have a same configuration and orientation. However, the structures in different rows have different orientations.

Thus, on the surface of the target object, the split ring resonators 31b-34b are rotated or pivoted (e.g., clockwise or counterclockwise) incrementally in varying degrees along the rotation direction. As a result, the structures in each row have a different angled orientation with respect to structures in neighboring rows, resulting in a gradual and continuous increase (or decrease) in coupling capacitance in the rotation direction. This makes the metamaterial sensitive to a polarization of the mm-wave, and, specifically changes the sensitivity to the electrical field component of the transmitted wave that changes along the rotation direction. Here, an influence on the polarization is realized since the direction of the dominant E Field in the gap is changing. Thus, a shift in polarization may be measured that is specific to the absolute angular position (i.e., an angular value) of the rotatable target object.

Figure 3C:
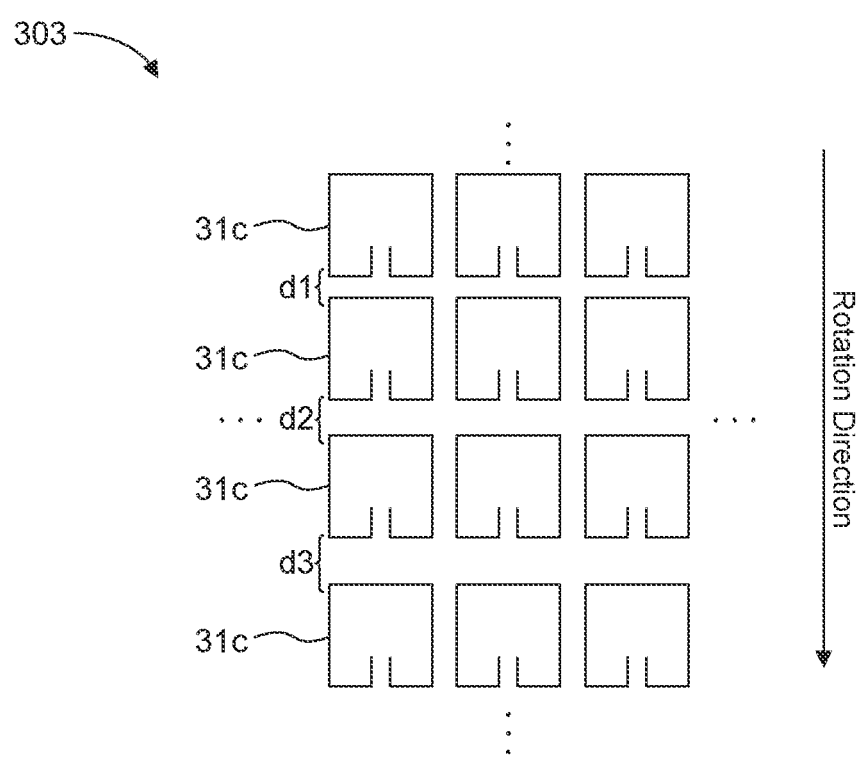

FIG. 3C is a schematic diagram of an array of elementary structures 303 of a metamaterial track according to one or more embodiments. Here, the array includes multiple rows of split ring resonators 31c in which the structures in throughout the array have a same configuration and orientation.

Here, the mutual capacitive coupling of the structures is gradually and continuously changed in the rotation direction by increasing or decreasing the distances d1, d2, d3, and so on between structures along the rotation direction. Thus, rows at the top are closer together than the rows at the bottom of the array. This scales the capacitance between structures in way that is periodical over 360°.

Figure 3D:
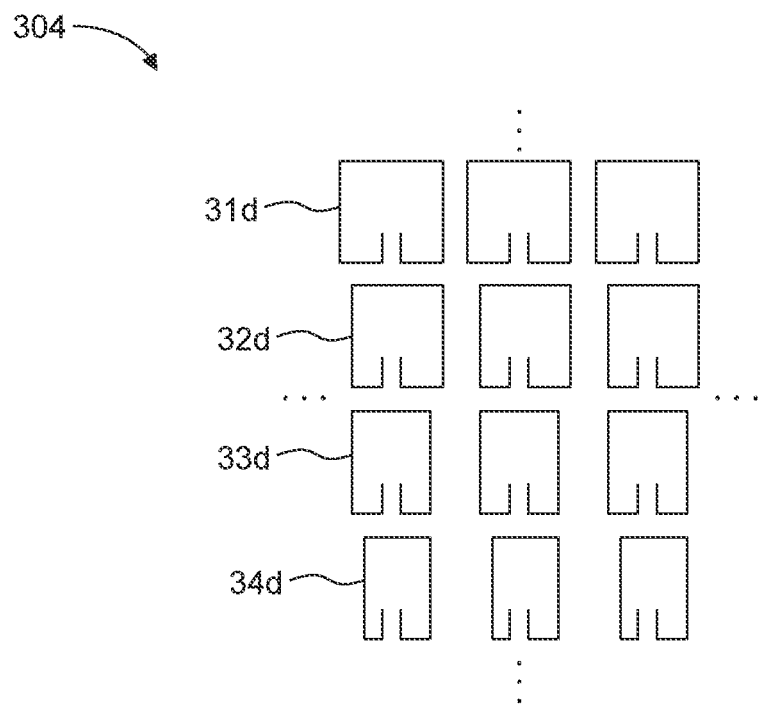

FIG. 3D is a schematic diagram of an array of elementary structures 304 of a metamaterial track according to one or more embodiments. Here, the array includes multiple rows of split ring resonators 31d-34d in which the structures in each row have a same configuration and orientation. However, the structures in different rows have different configurations.

In this case, an inductive coupling scaled by reducing or increasing the loop area in along the rotation direction. For example, the loop size of consecutive rows gradually changes along the rotation direction. Thus, the loop size of the split ring resonators 31d is larger than the loop size of the split ring resonators 32d, which is larger than the loop size of the split ring resonators 33d, and so on. This also results in a change in the spacing between structures in the direction perpendicular to the rotation direction, which may further change the capacitive coupling. This scales the inductive coupling and/or the capacitive coupling between structures in way that is periodical over 360°.

Figure 3E:
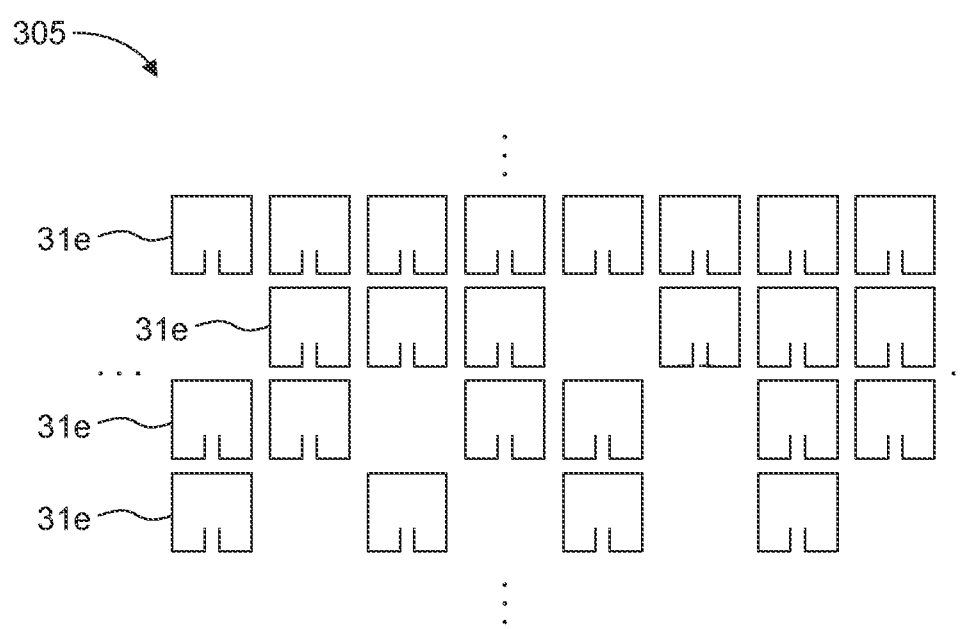

FIG. 3E is a schematic diagram of an array of elementary structures 305 of a metamaterial track according to one or more embodiments. Here, the array includes multiple rows of split ring resonators 31e in which the structures in throughout the array have a same configuration and orientation. However, the density of the structures is changed in the rotation direction by gradually and continuously increasing or decreasing the density of the structures along the rotation direction.

For example, each successive row of structures may be populated more densely or less densely than a preceding row of structures. For example, every position in a first row may be occupied by a structure making up a first (full) density of structures in that row. In a second row, less than every position is occupied by a structure making up a second density of structures in that row that is less dense than the first density. In a third row, less than every position is occupied by a structure making up a third density of structures in that row that is less dense than the second density, and so on. This scales the inductive coupling and/or the capacitive coupling between structures in way that is periodical over 360°.

Figure 3F:
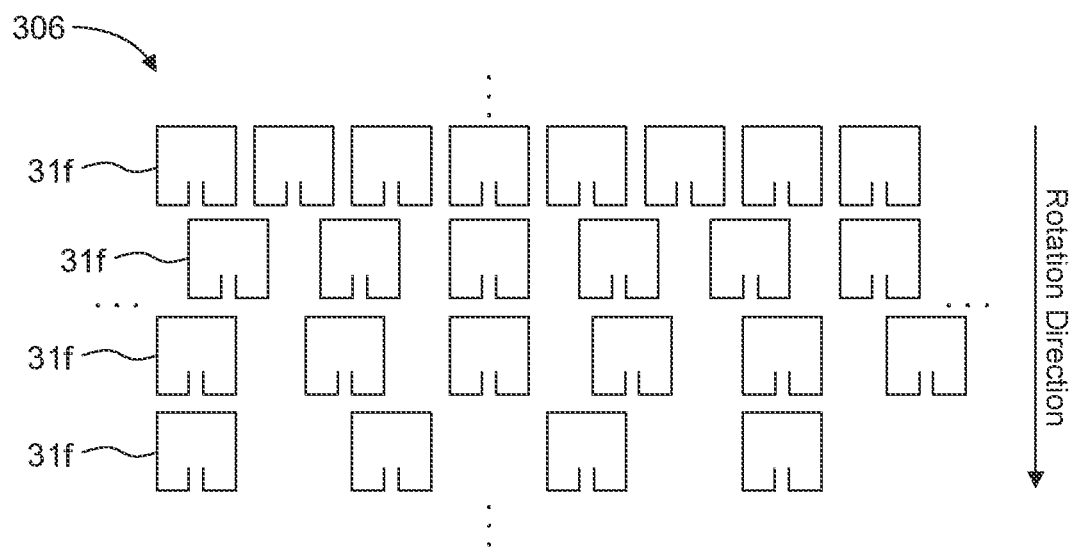

FIG. 3F is a schematic diagram of an array of elementary structures 306 of a metamaterial track according to one or more embodiments. Here, the array includes multiple rows of split ring resonators 31f in which the structures in throughout the array have a same configuration and orientation. However, the density of the structures is changed in the rotation direction by gradually and continuously increasing or decreasing the density of the structures along the rotation direction.

In this example, a lateral distance between structures in each successive row may be changed in the rotation direction by increasing or decreasing the spacing between structures along the rotation direction. For example, every position in a first row may be occupied by a structure making up a first (full) density of structures in that row. In a second row, the spacing between adjacent structures is increased in comparison to the spacing between adjacent structures in the first row, making up a second density of structures in that row that is less dense than the first density. In a third row, the spacing between adjacent structures is increased in comparison to the spacing between adjacent structures in the second row, making up a third density of structures in that row that is less dense than the second density, and so on.

Figure 3G:
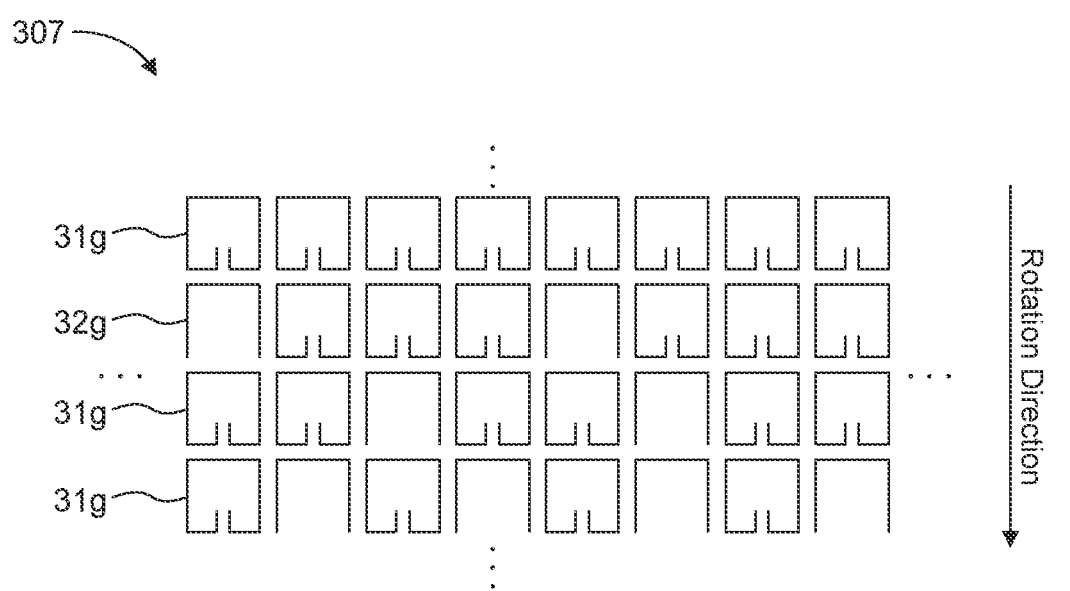

FIG. 3G is a schematic diagram of an array of elementary structures 307 of a metamaterial track according to one or more embodiments. Here, the array is a heterogeneous array of mixed different structures such that the structure types that populate the array is varied in different arrangements throughout the array. In this case, two different types of structures 31g and 32g are use in a pattern that gradually and continuously changes the inductive coupling and/or the capacitive coupling between structures in way that is periodical over 360°. It will be appreciated that two or more types of structures may also be used to form the heterogeneous array.

In view of the above examples, scaling of a metamaterial property is done with a pattern of structures that repeats or changes completely and continuously around the circumference of the rotatable target or along the perimeter of the metamaterial track such that a change in reflectivity and/or transmittivity follows a 360° periodical pattern where the reflectivity and/or transmittivity is unique for each discrete angle.

Figure 4A:
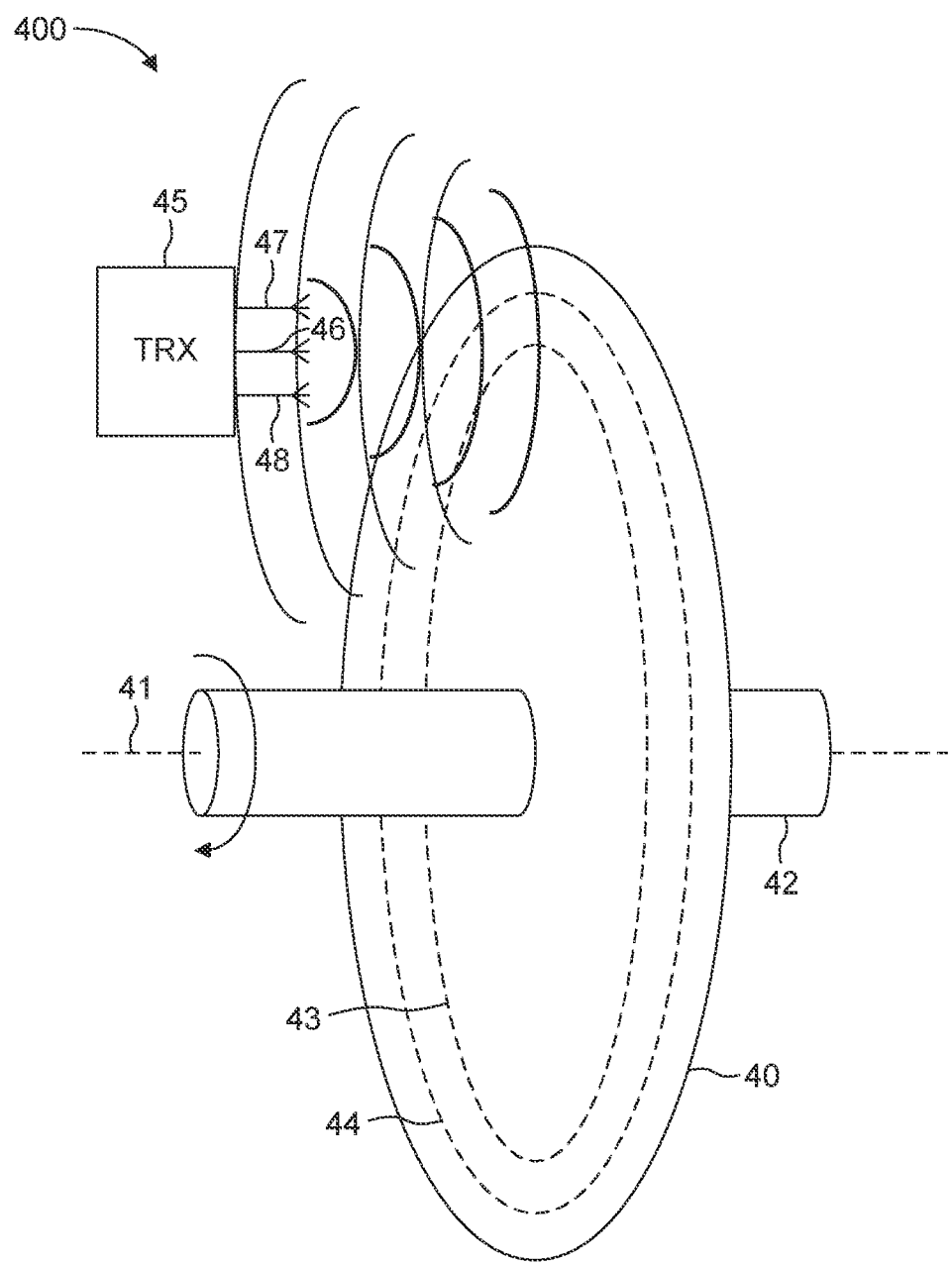
FIG. 4A is a schematic view of an angle sensor system according to one or more embodiments.

FIG. 4A is a schematic view of an angle sensor system 400 according to one or more embodiments. The angle sensor system 400 includes a rotatable target object 40 configured to rotate about an axis of rotation 41 (i.e., a rotational axis). The rotatable target object 40 may be a disc or a wheel coupled to a shaft 42 that extends along the rotational axis 41. As the shaft 42 rotates, so does the rotatable target object 40. The rotatable target object 40 represents a mechanical target for one or more mm-wave beams.

The rotatable target object 40 includes two mm-wave metamaterial tracks 43 and 44 that each form a closed loop around the shaft 42. In this example, the two mm-wave metamaterial tracks 43 and 44 are concentric loops located at different distances from the rotational axis. In some embodiments, it may be possible to use a single closed-loop metamaterial track or more than two closed-loop metamaterial tracks. The mm-wave metamaterial tracks 43 and 44 are fixed to the rotatable target object 40 such that they co-rotate with the rotatable target object 40 as it rotates.

It may also be possible to use tracks with different characteristic of the variations of the patterns, for example, implementing a sine function or a cosine function in the varying parameter of the metamaterial. Furthermore, reference tracks that do not change the characteristic of the meta material may be of interest to characterize the influence of environmental influences or setup parameters like the distance between the antenna and the meta material stripe or the temperature and humidity of the ambient environment. Multiple reference stripes with different metamaterial setups may be used to deliver different reference measurements. For example, different reference stripes may be used to provide for a minimum and a maximum of the variation of metamaterial properties.

The angle sensor system 400 further includes a transceiver TRX 45 configured to transmit and receive mm-waves. In particular, the transceiver 45 includes a transmitter antenna 46 configured to transmit a mm-wave beam (i.e., an electro-magnetic transmit signal) at the two metamaterial tracks 43 and 44. The transmitter antenna 46 may be further representative of multiple antennas or an antenna array. For example, in order to achieve a homogeneous radiation on each metamaterial track, multiple transmitter antennas or transmitter antenna arrays may be used such that each antenna or antenna array is focused on a different track. In this case, the transmitter antennas can be operated in parallel or by separate transmitters.

The transceiver 45 also includes two receiver antennas 47 and 48, each configured to receive a partially-reflected mm-wave (i.e., an electro-magnetic receive signal) from a corresponding metamaterial track of the two metamaterial tracks 43 and 44. In other words, the two receiver antennas 47 and 48 are isolated from each other in a way that receiver antenna 47 substantially receives a partially-reflected mm-wave only from one of the tracks (e.g., metamaterial track 44) and receiver antenna 48 substantially receives a reflected mm-wave only from the other one of the tracks (e.g., metamaterial track 43). Thus, isolations between the antennas or between the tracks, such as a metal stripe, may be provided.

While a small portion of a non-corresponding reflected mm-wave may be received at each antenna 47 and 48, this signal may be attenuated to the extent that the signal can be ignored or filtered out as noise by the transceiver 45.

In addition, it will be appreciated that the transceiver 45 may include two transmitter antennas instead of a single transmitter antenna, where each transmitter antenna is arranged to target a single metamaterial track. Thus, each mm-wave may be exclusively incident on a corresponding track. Alternatively, a transmitter antenna may target two or more tracks, where the mm-wave is exclusively incident on the corresponding tracks. Thus, different groups of tracks may be targeted by different transmitter antennas.

It will further be appreciated that two transceivers, one for each metamaterial track, can be used. It will further be appreciated that two receiver and transmitter pairs, one for each metamaterial track, can be used instead of one or more transceivers. It may also be implemented in a way where one antenna is used as a transmit and receive antenna and a splitter separates energy transmission paths (e.g., a rat-race coupler or a hybrid ring coupler) in the RF part. The splitter is configured to direct the received wave from the antenna to the receiver while it directs the transmit signal from the transmitter to the antenna for transmission.

Regardless of the configuration, it will be understood that at least one transmitter and at least one receiver is implemented for transmitting and detecting mm-wave beams where different receiving antenna and receiving circuitry correspond to different closed-loop metamaterial track on a one-to-one basis. The transmitters and receivers may be electrically coupled to a system controller and/or a DSP.

Figure 4B:
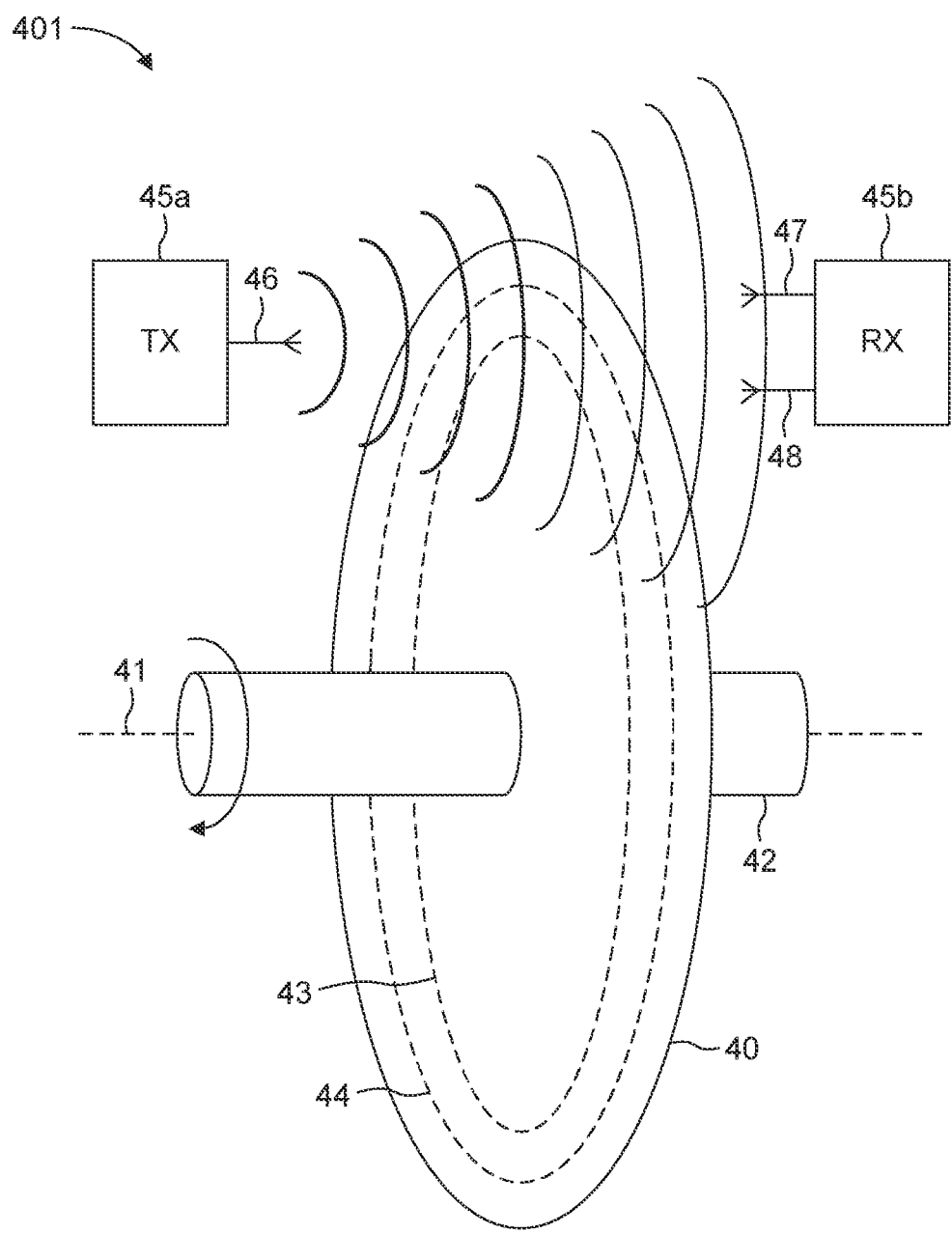
FIG. 4B is a schematic view of an angle sensor system according to one or more embodiments.

FIG. 4B is a schematic view of an angle sensor system 401 according to one or more embodiments. The angle sensor system 401 is similar to the angle sensor system 400 depicted in FIG. 3A, with the exception that the angle sensor system 301 is configured to monitor a mm-wave that passes through the two metamaterial tracks 43 and 44 instead of monitoring reflected mm-wave as was the case in FIG. 3A. As a result, angle sensor system 301 includes a transmitter 45a, including the transmitter antenna 46, and a receiver 45b, including the receiver antennas 47 and 48. The receiver antenna 47 is configured to receive a partially transmitted mm-wave (i.e., an electro-magnetic receive signal) as a result of the transmitted mm-wave interacting with (i.e., being partially absorbed by and transmitted through) the metamaterial track 44. Similarly, the receiver antenna 48 is configured to receive a partially transmitted mm-wave (i.e., an electro-magnetic receive signal) as a result of the transmitted mm-wave interacting with (i.e., being partially absorbed by and transmitted through) the metamaterial track 43.

It will also be appreciated that a combination of FIGS. 4A and 4B may be realized. For example, one receiver may be arranged for detecting and measuring a partially-reflected mm-wave from one of the metamaterial tracks (i.e., metamaterial track 44) and another receiver may be arranged for detecting and measuring a partially transmitted mm-wave that passes through the other one of the metamaterial tracks (i.e., metamaterial track 43). In addition, two receivers may be used for analyzing a same metamaterial track, where one detects and measures a partially-reflected mm-wave and the other detects and measures a partially-transmitted mm-wave. Accordingly, one metamaterial track may be configured with higher reflectivity and the other metamaterial track may be configured with a higher absorptivity with respect to one another.

Based on the embodiments shown in FIGS. 4A and 4B and combinations thereof, an electro-magnetic transmit signal is converted into an electro-magnetic receive signal by interacting with a metamaterial track. The interaction may include a reflection, an absorption, a transmission, or a combination thereof. Each receiver antenna is coupled to receiver circuitry configured to demodulate a receive signal in order to determine a characteristic of the receive signal. An absolute angular position of the rotatable target object 40 is then determined by the receiver circuit or a system controller utilizing a signal processor based on the determined characteristic.

In particular, each metamaterial track is configured such that a characteristic or property of the metamaterial changes along the perimeter of the track. Thus, how the metamaterial interacts with a mm-wave changes along the perimeter of the track. For example, the elementary structures of an array have a 360° periodical pattern that changes continuously around the circumference of the rotatable target and/or along the perimeter of the metamaterial track. Thus, the pattern continuously changes from 0° to 360° along the closed-loop of the metamaterial track, and then repeats. In this way, a property and/or arrangement of the metamaterial (i.e., of the elementary structures) is specific to an absolute angular position along the metamaterial track, and, thus, is also specific to an absolute angular position of the rotatable target object. An absolute angular position is an angular position relative to a predetermined (i.e., reference) angular position of the rotatable target object. For example, the reference angular position may be zero degrees, and an absolute angular position may a specific position rotated from zero degrees over a 360° period. Thus, each absolute angular position has an absolute angular value from 0° to 360°.

More generally, it is possible for the periodical pattern of the elementary structures of an array to have a period of 360°/N, with N being an integer number greater than zero. That is, the periodical pattern repeats every 360°/N. In this case, multiple predetermined (i.e., reference) angular positions of the rotatable target object may be known, and each absolute angular position has an absolute angular value from one of the reference angular positions. Each reference angular position is detectable based on the characteristic or property of the metamaterial at a specific position along the track. The angular rate of change may also be used to calculate the rotation speed.

The characteristic or property of the metamaterial at a specific position along the track results an angle-dependent behavior or interaction with an mm-wave, where the angle-dependent behavior or interaction is an angle-dependent reflection, angle-dependent absorption, angle-dependent transmission, or an angle-dependent combination thereof.

A receiver circuit may receive and demodulate a receive signal, and evaluate an amplitude modulation and/or a phase modulation of the receive signal using amplitude analysis and/or phase analysis, respectively. For example, the receiver circuit may evaluate an amplitude variation or a phase shift of the receive signal. The receive circuit may then determine an absolute angular position of the metamaterial track and/or the rotatable target object based on the determined amplitude modulation or phase modulation. For example, the receiver circuit may refer to a look-up table provided in memory that stores angular positions relative to a specific amplitude modulation or phase modulation.

Thus, either the amplitude or the phase of the received signal is analyzed with respect to the same property of the transmitted signal. The metamaterial is a passive structure, it cannot the frequency of the signal. However, it can change its own resonance frequency or, better said, the locations of its poles and zeros, which can then influence the reflected or the transmitted signal and be detected in amplitude and phase or in real and imaginary part of the signal. Both combinations describe the possible influence completely. Analyzing the shift of a resonance or a pole or a zero may also be characterized over the frequency with a frequency sweep of the transmit signal, but requires a more complex evaluation circuitry.

As an example for determining an absolute angular position or discrete angular value for a given metamaterial track, the transceiver 45 may transmit a continuous mm-wave as a carrier signal that has a constant frequency. Each metamaterial track receives the carrier signal and partially reflects or transmits the signal back at the transceiver 45. The transceiver 45 includes a receiver circuit that includes two demodulators (e.g., two mixers), each configured to demodulate a received signal from a corresponding metamaterial track. Alternatively, the receiver circuit may include a multiplexer coupled to single demodulator that demodulates both received signals in a multiplexed manner. In any case, the receiver circuit is configured to determine a phase and/or an amplitude of each received signal, and compare the determined phase and/or amplitude to the phase and/or amplitude of the carrier signal, respectively, to derive the absolute angular position of the corresponding metamaterial track. A certain change in phase or amplitude relative to the carrier signal (i.e., a phase shift or an amplitude shift) can correspond to the absolute angular position of the corresponding metamaterial track.

In addition, a phase shift between two receive signals may be analyzed for determining an absolute angular position. For example, the rotated patterns of metamaterial tracks 43 and 44 may be the same but shifted 90° (e.g., clockwise or counterclockwise) from each other such that there is a 90° phase shift in the extracted signals resultant from the two metamaterial tracks after the evaluation of the metamaterial property. This means that two metamaterial tracks at the same corresponding angle of rotation would produce extracted signals that are 90° out of phase from each other. This essentially produces a sine measurement signal and a cosine measurement signal while the rotatable target object is rotating, that when compared to each other identifies a unique angular position.

Alternatively, two receiver antennas can be focused on the same metamaterial tracks, but spaced 90° apart. In other words, the placement of the two receiver antenna is such that the pattern of the metamaterial at those locations is shifted with respect to each other that results in a 90° phase shift in the extracted signals resultant at those two locations. Again, this essentially produces a sine wave measurement signal and a cosine wave measurement signal while the rotatable target object is rotating, that when compared to each other identifies a unique angular position.

Analyzing a receive signal from a single track may be used to determine the angular position (i.e., an angular value) of the rotatable target object. From this, the rotational speed may also be calculated by determining a rate of change in the angular values. Additionally, by obtaining two measurement signals (e.g., two 90° phase shifted signals), a rotation direction of the rotatable target object may also be determined.

For example, the rotation direction may be determined at each zero-crossing or at some other switching threshold of a first measurement signal (e.g., a sine measurement signal or a cosine measurement signal). For example, a DSP may determine whether the first measurement signal has a zero-crossing on a falling edge or on a rising edge, and may further analyze the correlation to a negative value or positive value of a second measurement signal (e.g., the other of the sine measurement signal and the cosine measurement signal).

For example, a negative value of the second measurement signal at a falling edge of the first measurement signal may indicate a first rotation direction. A positive value of the second measurement signal at a rising edge of the first measurement signal may also indicate the first rotation direction. A positive value of the second measurement signal at a falling edge of the first measurement signal may indicate a second rotation direction. A negative value of the second measurement signal at a rising edge of the first measurement signal may also indicate the second rotation direction. Since the second measurement signal is 90° phase shifted to the first measurement signal, the determination of rotation direction is less susceptible to error that may be cause by external stray fields, biasing noise, and other types of interference.

In addition, or in the alternative, the DSP may evaluate the sign of the second measurement signal at each zero crossing of the first measurement signal. If the sign of the second measurement signal alternates between two successive zero crossings (+− or −+), the rotation direction remains the same. However, if the sign of the second measurement signal between two successive zero crossings does not alternate, (++ or −−) a direction change is detected by the DSP.

Alternatively, in cases where sine and cosine are available for the calculation of the angle, the rotation direction is self-evident depending on increase or decrease of the angle value without using a switching threshold.

The wide range of flavors that metamaterials offer with different structures, layers, and mutual coupling could be evaluated based on a complete measurement of the parameters using a frequency modulated signal over the range in which the spectral relevant effects of the metamaterial appear. However, the target applications will provide a low cost measurement compared to a traditional radar. Thus, the circuit effort may be minimized and the RX/TX setup will depend on the final metamaterial design.

Figure 5A:
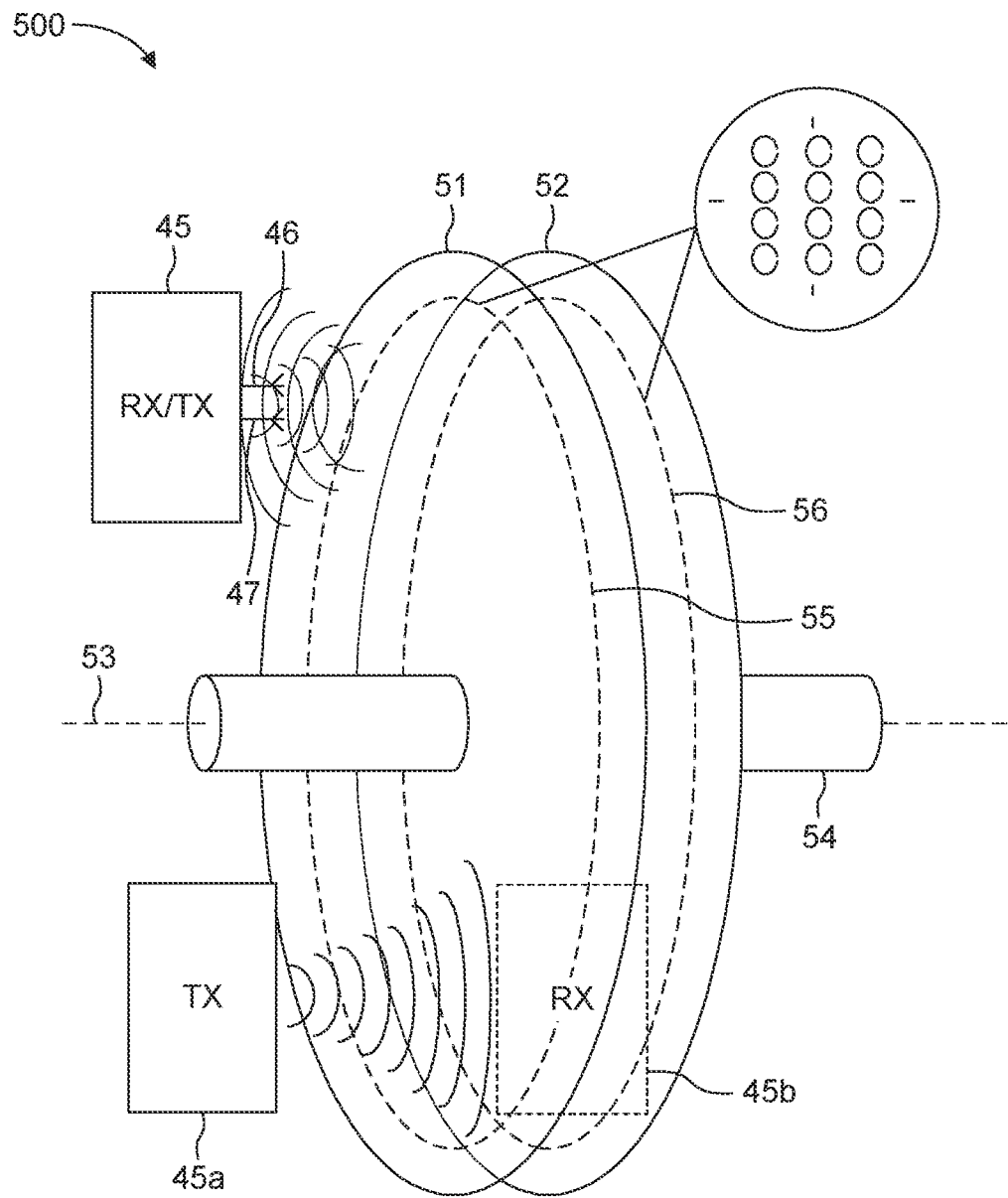
FIG. 5A is a schematic view of a torque measurement system according to one or more embodiments.

FIG. 5A is a schematic view of a torque measurement system 500 according to one or more embodiments. The torque measurement system 500 includes a first rotatable target object 51 as a first rotatable carrier structure and a second rotatable target object 52 as a second rotatable carrier structure. Both carrier structures are configured to rotate about an axis of rotation 53 (i.e., a rotational axis). The rotatable target objects 51 and 52 may be a disc or a wheel coupled to a shaft 54 that extends along the rotational axis 53. As the shaft 54 rotates, so do the rotatable target objects 51 and 52. The rotatable target objects 51 and 52 represent mechanical targets for one or more mm-wave beams. Additionally, the rotatable target objects 51 and 52 are laterally separated from each other by a distance along the shaft 54. In particular, they are laterally spaced apart from each other in a transmission direction of mm-wave beams.

Each rotatable target object 51 and 52 includes a mm-wave metamaterial track 55 and 56, respectively, that each form a closed loop around the shaft 54. In this regard, each target object 51 and 52 is a carrier structure for its respective mm-wave metamaterial track. The mm-wave metamaterial tracks 55 and 56 are fixed to a respective rotatable target object 51 or 52 such that they co-rotate with the respective rotatable target object 51 or 52 as it rotates. Additionally, the mm-wave metamaterial tracks have the same size and shape. As such, in a similar manner regarding the rotatable target objects 51 and 52, the metamaterial tracks 55 and 56 are laterally spaced apart from each other, and, more particularly, are laterally spaced apart from each other in a transmission direction of mm-wave beams.

According to at least one embodiment, metamaterial tracks 55 and 56 each have an array of structures whose properties do not change in the rotation direction, as explained above in reference to FIG. 2A. Furthermore, the two metamaterial tracks 55 and 56 are close enough that the two tracks have a mutual coupling with each other that is induced by a field effect (e.g., an electric field coupling, a magnetic field coupling, or an electromagnetic field coupling) thereby forming a resonant multitrack structure (i.e., a mutually coupled structure). The mutual coupling between tracks 55 and 56 results in a torque-dependent behavior or interaction with an mm-wave where the torque-dependent behavior or interaction is a torque-dependent reflection, a torque-dependent absorption, a torque-dependent transmission, or a torque-dependent combination thereof.

When the shaft 54 rotates, there is a torque dependent shift in angular position (i.e., an angular shift) between the two metamaterial tracks 55 and 56 due to the torque applied to the shaft 54. This results in a torque dependent shift in the mutual coupling between the two metamaterial tracks 55 and 56. Since multiple of the metamaterial properties change simultaneously in response to the applied torque, multiple mm-wave parameters of a signal either transmitted, reflected, or emitted by mutually coupled metamaterial tracks will depend on the applied torque. Two or more mm-wave parameters of a same signal or of different signals may be evaluated simultaneously to discriminate the applied torque. Similarly, a single parameter of two or more signals may also be evaluated to discriminate the applied torque. Consequently, a measurement of all relevant variations can be used to improve the unambiguousness of the torque determination.

The torque measurement system 500 further includes a transceiver TRX 45 configured to transmit and receive mm-waves, or a transmitter 45a and a receiver 45b configured to transmit and receive mm-waves. The transmitter 45a and a receiver 45b may be placed such that the two rotatable target objects 51 and 52 and, thus, the two tracks 55 and 56, are arranged between the transmitter 45a and a receiver 45b.

The transceiver 45 includes a transmitter antenna 46 configured to transmit a mm-wave beam (i.e., an electro-magnetic transmit signal) as a wireless electro-magnetic signal focused at the two metamaterial tracks 55 and 56. In the case that a separate transmitter 45a and receiver 45b is used, the transmitter 45a may be equipped with the transmitter antenna 46.

The transceiver 45 also includes a receiver antenna 47 configured to receive a partially-reflected mm-wave (i.e., an electro-magnetic receive signal) as a wireless electro-magnetic signal from both metamaterial tracks 55 and 56. It may also be implemented in a way where one antenna is used as a transmit and receive antenna and a splitter separates energy transmission paths (e.g., a rat-race coupler or a hybrid ring coupler) in the RF part. The splitter is configured to direct the received wave from the antenna to the receiver while it directs the transmit signal from the transmitter to the antenna for transmission.

In the case that a separate transmitter 45a and receiver 45b is used, the receiver 46a may be equipped with the receiver antenna 47. Here, the torque measurement system 500 is configured to monitor mm-waves that pass through the two metamaterial tracks 55 and 56 instead of monitoring reflected mm-waves as was the case with the transceiver 45. As a result, the receiver antenna 47 is configured to receive partially transmitted mm-waves (i.e., electro-magnetic receive signals) as a result of the transmitted mm-wave interacting with (i.e., being partially absorbed by and transmitted through) the metamaterial tracks 55 and 56.

It will further be appreciated that two transceivers, one for each metamaterial track, can be used. It will further be appreciated that two receiver and transmitter pairs, one for each metamaterial track, can be used instead of one or more transceivers. It may also be implemented in a way where one antenna is used as transmit and receive antenna and a splitter separates energy transmission paths (e.g., a rat-race coupler or a hybrid ring coupler) in the RF part. The splitter is configured to direct the received wave from the antenna to the receiver while it directs the transmit signal from the transmitter to the antenna for transmission.

Regardless of the configuration, it will be understood that at least one transmitter and at least one receiver is implemented for transmitting and detecting mm-wave beams. The transmitters and receivers may be electrically coupled to a system controller and/or a DSP.

As noted above, the two metamaterial tracks 55 and 56 are close enough that the tracks have a mutual coupling (e.g., an electric field coupling, a magnetic field coupling, or an electromagnetic field coupling) with each other thereby forming a resonant structure that results in a torque dependent shift of the transmission or the reflection that is caused by the resonant structure. The torque dependent mutual coupling between the metamaterial tracks 55 and 56 may be capacitive, inductive, or a combination thereof. In the latter case, one type of coupling may be dominant. For example, capacitive coupling between the two tracks may be dominant.

As an example, in the case that the two metamaterial tracks 55 and 56 are made up of elementary structures 15, the elementary structures 15 of the two metamaterial tracks 55 and 56 couple together to form a split ring resonator 18 as an elementary structure having two poles, which is a resonator whose poles are modified by the shift between the two layers caused by the applied torque. Thus, the mutual coupling characteristic between the two tracks 55 and 56 changes based on the rotational displacement the two tracks undergo as a result of the applied torque. As a result, one or more properties (e.g., amplitude and/or phase) of the signal emitted from the resonant multitrack structure formed by the two tracks changes based on the rotational displacement, which thus changes based on the applied torque.

In another example, the two metamaterial tracks 55 and 56 are made up of elementary structures 2, the elementary structures 2 of the two metamaterial tracks 55 and 56 couple together to form a stacked split ring resonator structure 17 having four pols (2 poles for each elementary structure 2), which is a resonator whose poles are modified by the shift between the two layers caused by the applied torque. Thus, the mutual coupling characteristic between the two tracks 55 and 56 changes based on the rotational displacement the two tracks undergo as a result of the applied torque. As a result, one or more properties (e.g., amplitude and/or phase) of the signal emitted from the resonant multitrack structure formed by the two tracks changes based on the rotational displacement, which thus changes based on the applied torque.

It will be appreciated that other combinations of elementary structures is possible, forming different types of mutually coupled structures that have one or more characteristics that change based on the rotational displacement caused by the applied torque.

It is also noted that the mm-wave, being an electromagnetic wave, has an electrical field component that stimulates the capacitance of a metamaterial track or the resonant multitrack structure and a magnetic field component that stimulates the inductance of a metamaterial track or the resonant multitrack structure. Each elementary structure reflects a part of the mm-wave directly, transmits a part of the mm-wave directly, and receives a part of the energy and stores it in its resonance oscillation. The oscillation caused by the transmission radiates a part of the energy in either direction. Thus, each metamaterial track absorbs part of the energy and stores it. Additionally, each metamaterial track eventually emits the energy that has been absorbed and stored.

The resonant multitrack structure, also referred to as a mutually coupled (multitrack) structure, may also be viewed as a single structure that emits a mm-wave, either as a reflection and/or a transmission, in response to the transmitted mm-wave from the transceiver 45 impinging thereon. This emitted wave has a torque dependent property that may be evaluated by the receiver circuit to determine the applied torque. For example, a phase shift and/or an amplitude shift of the received signal with respect to the transmitted mm-wave may be determined and evaluated to determine the applied torque.

In particular, when the shaft 54 rotates, there is a torque dependent shift in angular position (i.e., an angular shift) between the two metamaterial tracks 55 and 56 due to the torque applied to the shaft 54. For example, the target objects 51 and 52 rotate by different amounts due to the applied torque. As a result, the absolute angular position or discrete angular value corresponding to track 55 is different than the absolute angular position or discrete angular value corresponding to track 56, resulting in angular difference or angular shift that is proportional to the applied torque. The coupling effect between tracks 55 and 56 is torque-dependent and changes based on their angular shift resultant from the applied torque. This change in coupling in turn impacts at least one coupling-dependent property of a signal interacting with the mutually coupled structure, which can be measured to determine the applied torque.

A processor at the receiver is configured to receive at least one signal from the mutually coupled structure and determine the applied torque based on one or more evaluated properties of the at least one received signal. The processor may determine the applied torque based on the evaluated property or properties using, for example, a look-up table or an algorithm.

For example, the signal emitted by the mutually coupled structure formed by tracks 55 and 56 may have at least one property or combination of properties unique to the angular shift therebetween, and thus unique to the applied torque. This is referred to as a direct torque measurement.

Alternatively, the processor may receive signals from each track 55 and 56 of the mutually coupled structure, determine a torque-dependent absolute angular position corresponding to each track, determine the angular difference or shift therefrom, and then determine the applied torque based on the determined angular difference using, for example, a look-up table or an algorithm. In this case, the tracks 55 and 56 may have array structures that vary in the rotation direction, as described in reference to 3A-3G, so that the angular position of each track can be determined. This is referred to as an indirect torque measurement.

As an example for determining an absolute angular position or discrete angular value for a given metamaterial track, the transceiver 45 may transmit a continuous mm-wave as a carrier signal that has a constant frequency. Each metamaterial track that receives the carrier signal may partially reflect the signal back at the transceiver 45. The transceiver 45 includes a receiver circuit that includes two demodulators (e.g., two mixers), each configured to demodulate a received signal from a corresponding metamaterial track. Alternatively, the receiver circuit may include a multiplexer coupled to single demodulator that demodulates two received signals in a multiplexed manner. In any case, the receiver circuit is configured to determine a phase and/or an amplitude of each received signal, and compare the determined phase and/or amplitude to the phase and/or amplitude of the carrier signal, respectively, to derive the absolute angular position of the corresponding metamaterial track. A certain change in phase or amplitude relative to the carrier signal (i.e., a phase shift or an amplitude shift) corresponds to the absolute angular position of the corresponding metamaterial track. It is also possible for the receiver circuit to match the phase and/or amplitude differences of two received signals (i.e., one from each track 55 and 56) directly to the torque without calculating the absolute angular positions, via a mapping, look-up table, or the like, that maps differential values of phase and/or amplitude to different amounts of torque (i.e., torque values).

An applied torque for a given mutually coupled structure may be determined in a similar manner for a direct torque measurement. For instance, the transceiver 45 may transmit a continuous mm-wave as a carrier signal that has a constant frequency at the mutually coupled structure. The mutually coupled structure that receives the carrier signal may partially reflect the signal back at the transceiver 45. The mutual coupling between two metamaterial tracks of the mutually coupled structure depends on the applied torque, which is affects a torque dependent property of the reflected signal.

The transceiver 45 includes a demodulator that is configured to demodulate the received signal and a processor that is configured to evaluate a property of the received signal using at least one of phase analysis, amplitude analysis, or spectral analysis, and determine the applied torque based on the evaluated property.

In particular, the processor is configured to determine a phase and/or an amplitude of each received signal, and compare the determined phase and/or amplitude to the phase and/or amplitude of the carrier signal, respectively, to derive the applied torque. A certain change in phase or amplitude relative to the carrier signal (i.e., a phase shift or an amplitude shift) corresponds to the applied torque.

In summary, the torque measurement system 500 uses two target objects (i.e., two carrier structures) 51 and 52 each with a metamaterial pattern 55 and 56 on their neighboring surfaces. Each carrier structure is fixed to a shaft 54 within a certain distance between the neighboring carrier structures. If a torque is applied to the shaft 54, the shaft 54 winds depending on its thickness and its Young's modulus. The distance between the carrier structures is close enough to ensure that the two metamaterial tracks 55 and 56 mutually couple. Depending on the shift of the two metamaterial patterns of the two metamaterial tracks, the coupling effect between the two metamaterial tracks changes. This coupling effect is unique to the amount of applied torque. As a result, the change in the coupling effect causes a property of one or more signals emitted from the metamaterial tracks 55 and 56 to be altered, which can be measured and analyzed for determining the applied torque.

Figure 5B:
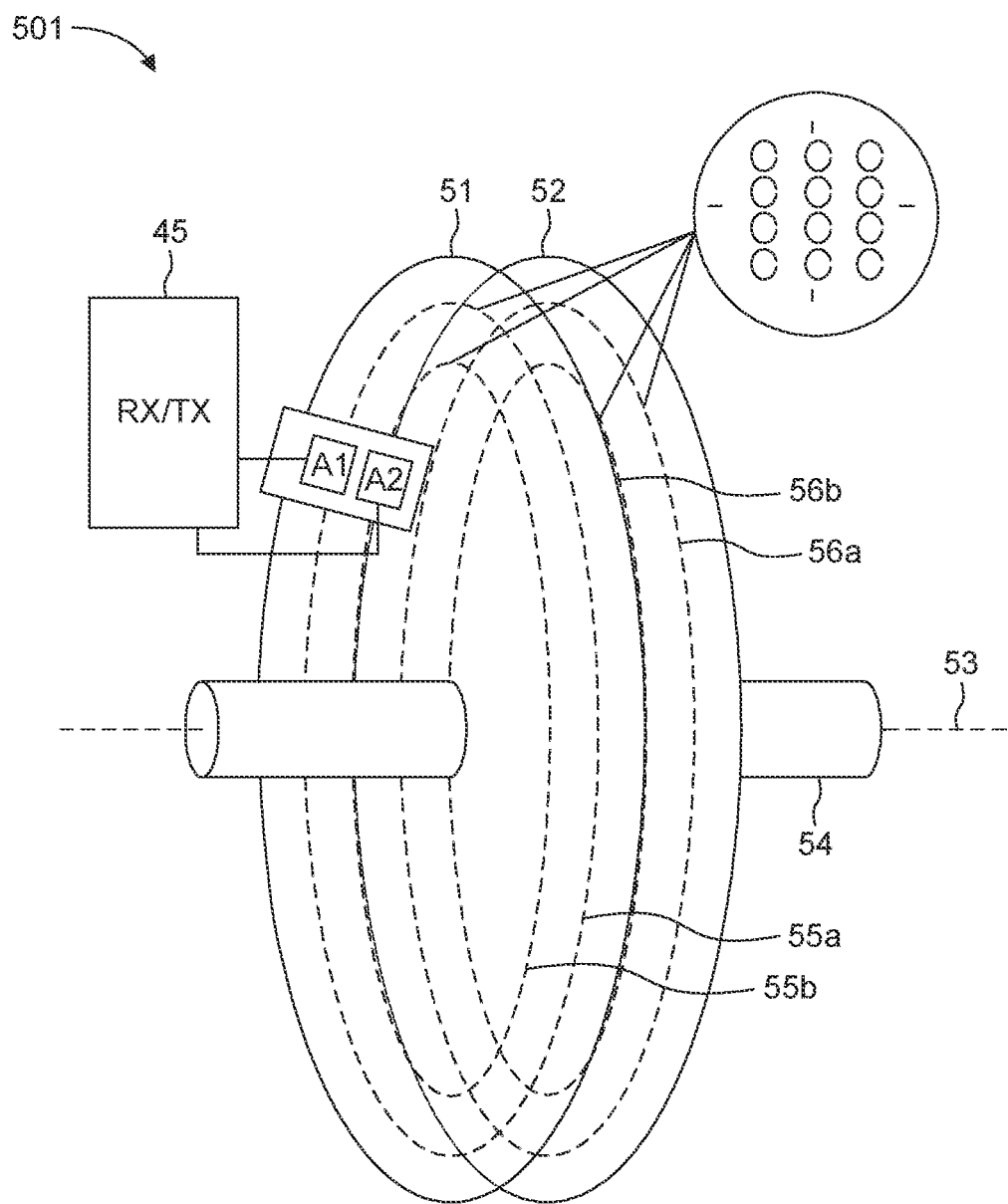
FIG. 5B is a schematic view of another torque measurement system according to one or more embodiments.

FIG. 5B is a schematic view of a torque measurement system 501 according to one or more embodiments. The torque measurement system 501 is similar to the torque measurement system 500 depicted in FIG. 5A, with the exception that the torque measurement system 401 includes additional metamaterial tracks on each rotatable target object 51 and 52. Two metamaterial tracks 55a and 55b are attached to rotatable target object 51 and two metamaterial tracks 56a and 56b are attached to rotatable target object 52. The two mm-wave metamaterial tracks 55a and 55b attached to rotatable target object 51 are concentric loops located at different distances from the rotational axis 53. Similarly, the two mm-wave metamaterial tracks 56a and 56b attached to rotatable target object 52 are concentric loops located at different distances from the rotational axis 53.

Furthermore, metamaterial tracks 55a and 56a are aligned (i.e., are located at the same radial distance from the rotational axis 53) and are in close proximity such that they are mutually coupled. Similarly, metamaterial tracks 55b and 56b are aligned (i.e., are located at the same radial distance from the rotational axis 53) and are in close proximity such that they are mutually coupled. Thus, two mutually coupled structures are formed, where the first one is formed by tracks 55a and 56a, and the second one is formed by tracks 55b and 56b.

In addition, the torque measurement system 401 includes two antennas A1 and A2 both configured to transmit and receive mm-wave signals. Here, antenna A1 is aligned with metamaterial tracks 55a and 56a, and, as such, is configured to transmit a mm-wave beam at those mutually coupled tracks and receive reflected signals therefrom. Similarly, antenna A2 is aligned with metamaterial tracks 55b and 56b, and, as such, is configured to transmit a mm-wave beam at those mutually coupled tracks and receive reflected signals therefrom.

As a result, different regions of metamaterial tracks can be arranged on the carrier structures and provide a different measurements. Preferably, the different regions at which the metamaterial tracks on a same carrier structure are attached are spaced in a way that the coupling between an inner rings and an outer ring is negligible compared to the coupling between the rings on the different carrier structures. For example, tracks 55a and 56a are strongly coupled by a field effect, whereas tracks 55a and 55b are weakly coupled or not coupled by a field effect. For this reason, tracks 55a and 56a may form a first coupled pair of tracks and tracks 55b and 56b may form a second coupled pair of tracks.

An antenna A1 or A2 is associated to each mutually coupled structure. Preferably the antennas A1 and A2 should have a directional characteristic that focusses their transmission and reception on the associated rings of the metamaterial structures. Thus, antenna A1 has a directional characteristic associated with tracks 55a and 56a (i.e., a first mutually coupled structure), and antenna A2 has a directional characteristic associated with tracks 55b and 56b (i.e., a second mutually coupled structure).

In case of identical patterns of elementary structures, the displacement of the elementary structures on both carrier structures will be different due to the different radius ($d1=r1*da$; $d2=r2*da$). Consequently, the change of the mm-wave property is lower on the inner track than on the outer track. In other words, a same angle shift of the shaft 54 causes a different change in the coupling of the two pairs of coupled tracks, resulting in two different signal modulations (i.e., amplitude and/or phase) in the receive signals generated by the different coupled pair of tracks.

The receiver circuit of transceiver 45 may then use a differential measurement to discriminate the applied torque which is more robust against external factors such as the influence of distance changes. For example, the receiver circuit may use signals received from the two mutually coupled structures to perform a differential measurement of the applied torque via a differential algorithm applied to the two signals.

Figure 5C:
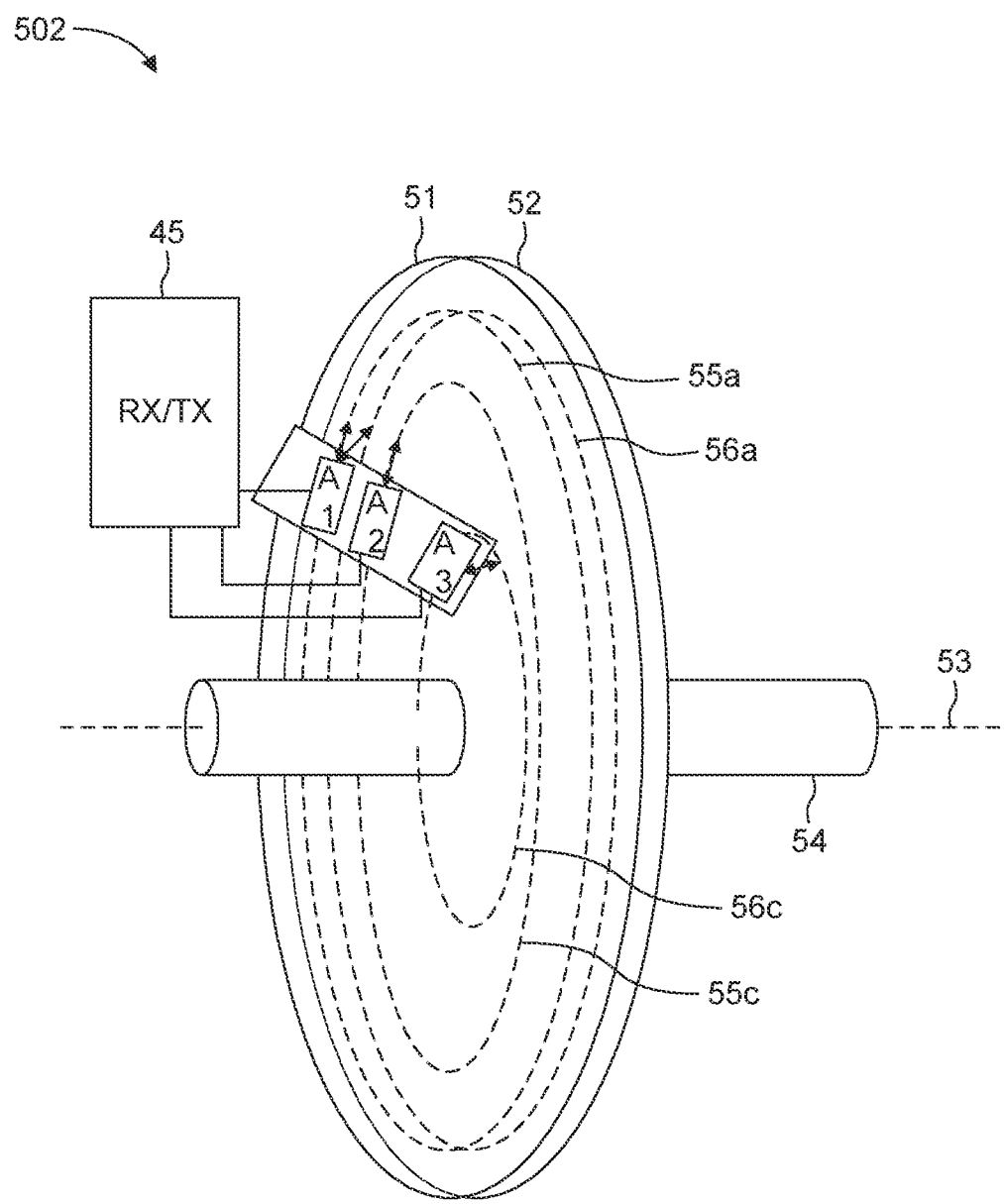
FIG. 5C is a schematic view of another torque measurement system according to one or more embodiments.

FIG. 5C is a schematic view of a torque measurement system 502 according to one or more embodiments. The torque measurement system 502 is similar to the torque measurement system 500 depicted in FIG. 5A, with the exception that the torque measurement system 502 includes additional metamaterial tracks on each rotatable target object 51 and 52. Two metamaterial tracks 55a and 55c are attached to rotatable target object 51 and two metamaterial tracks 56a and 56c are attached to rotatable target object 52. Thus, a single mutually coupled structure is formed by tracks 55a and 56a.

The two mm-wave metamaterial tracks 55a and 55c attached to rotatable target object 51 are concentric loops located at different distances from the rotational axis 53. Similarly, the two mm-wave metamaterial tracks 56a and 56c attached to rotatable target object 52 are concentric loops located at different distances from the rotational axis 53. Furthermore, tracks 55c and 56c are located at different distances from the rotational axis 53 such that mutual coupling therebetween is weak or zero.

This arrangement is similar to the torque measurement system 401 depicted in FIG. 5B, except the additional tracks 55c and 56c are not mutually coupled to each other or to any other track as is the case with tracks 55b and 56b. Instead, tracks 55c and 56c are reference metamaterial tracks for their respective target object (i.e., carrier structure) 51 or 52, may be used to determine an absolute angular position of its respective target object 51 or 52, or may be used to measure a rotational speed of its respective target object 51 or 52.

Tracks 55c and 56c may both have an array of structures that has at least one property that changes in the rotation direction, as explained above in reference to FIGS. 3A-3G. For example, a pattern of track 55c may have a 360°/N periodic change, where N is an integer greater than zero. Thus, track 55c may be configured to modify an electro-magnetic transmit signal as it rotates, thereby producing an electro-magnetic receive signal having a periodic change proportional to a rotational speed of target object 51. The periodic change may be a periodic change in amplitude or phase induced by the rotation of track 55c. As a result, the rate of periodic change, akin to a frequency is proportional to a rotational speed of track 55c that can be measured by the transceiver. A rate of change in measured angular values via track 55c could also be used to measure the rotational speed of track 55c. Track 56c may be used in a similar manner for measuring the rotational speed of its target object 52. The rotational speeds of tracks 55c and 56c are equal to the rotational speed of the shaft 54.

When N=1, the characteristic or property of the metamaterial at a specific position along the track results an angle-dependent behavior or interaction with an mm-wave, where the angle-dependent behavior or interaction is an angle-dependent reflection, angle-dependent absorption, angle-dependent transmission, or an angle-dependent combination thereof. Since multiple of the metamaterial properties are changing simultaneously, multiple mm-wave parameters of a signal either transmitted, reflected, or emitted by a metamaterial track will depend on the rotational angle. Two or more mm-wave parameters of a same signal or of different signals may be evaluated simultaneously to discriminate the rotational position. Similarly, a single parameter of two or more signals may also be evaluated to discriminate the rotational position. Consequently, a measurement of all relevant variations can be used to improve the unambiguousness of the angle determination.

Here, three antennas A1, A2, and A3 are utilized, each having a directional characteristic that focusses their transmission and reception on the one or more associated rings of the metamaterial structures. Thus, antenna A1 has a directional characteristic associated with tracks 55a and 56a, antenna A2 has a directional characteristic associated with track 55c, and antenna A3 has a directional characteristic associated with track 56c Thus, there is an additional metamaterial track 55c, read by antenna A2, that is added on the front carrier structure 51 without a coupling track on the backside carrier structure 52, and an additional metamaterial track 56c, read by antenna A3, that is added to the backside carrier structure 52 without a coupling to the front side carrier structure 51. Consequently, the mm wave properties of those reference tracks 55c and 56c are not influenced by the displacement of the two carrier structures relative to each other due to mutual coupling and are therefore torque independent. Whereas the mutual coupling between tracks 55a and 56a and the mutual coupling between tracks 55b and 56b are torque dependent.

These reference tracks 55c and 56c can be used by the receiver circuit of the transceiver 45 as references for measurements that can be used to eliminate influences resulting from the setup, e.g., variations of the distance between the antennas and the distance between the two carrier structures 51 and 52.

For example, the receiver circuit of the transceiver 45 may be configured to determine a torque-independent absolute angular position of the carrier structure 51 by analyzing an amplitude modulation or a phase modulation of a receive signal received from track 55c at antenna A2 in reference to a carrier signal transmitted by the antenna A2 based on methods described above. The receiver circuit may use the torque-independent absolute angular position as the actual absolute angular position of the carrier structure 51, which may be further used to calculate the rotational speed thereof. Additionally, the receiver circuit may use the torque independent absolute angular position to detect preexisting errors in the set up and compensate the torque dependent measurements.

Similarly, the receiver circuit of the transceiver 45 may be configured to determine a torque independent absolute angular position of the carrier structure 52 by analyzing an amplitude modulation or phase modulation of a receive signal received from track 56c at antenna A3 in reference to a carrier signal transmitted by the antenna A3 based on methods described above. The receiver circuit may use the torque independent absolute angular position as the actual absolute angular position of the carrier structure 52, which may be further used to calculate the rotational speed thereof. Additionally, the receiver circuit may use the torque independent absolute angular position to detect preexisting errors in the set up and compensate the torque dependent measurements.

In addition, the torque independent structures may also be angle independent. For example, tracks 55c and 56c may have a homogeneous pattern, such as the one shown in FIG. 2A, with known behavior for the measurement of the distance between the track and the antenna.

Figure 6:
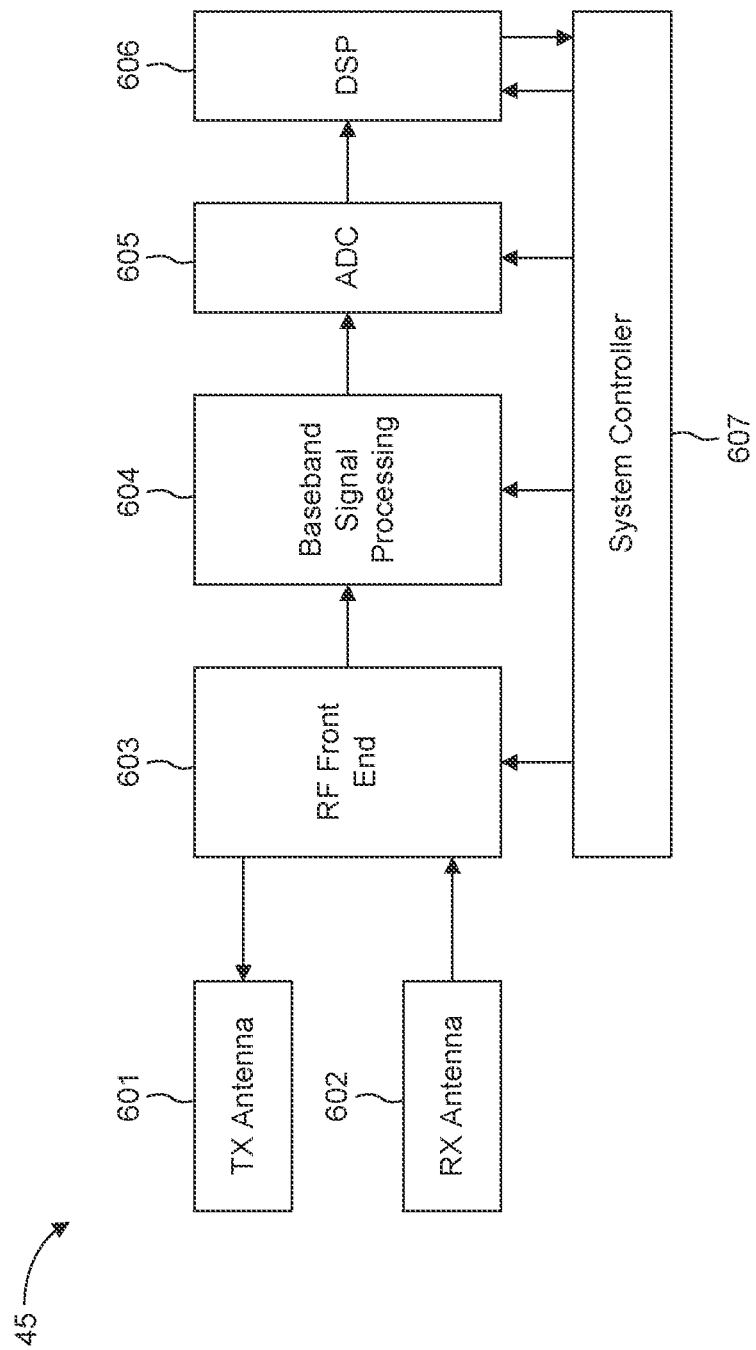
FIG. 6 is a block diagram that illustrates structure of one example of a transceiver according to one or more embodiments.

FIG. 6 is a block diagram that illustrates structure of one example of a transceiver according to one or more embodiments. The transceiver 45 includes relevant transmission circuitry and receiver circuitry to the embodiments described herein. It will also be appreciated that relevant transmission circuitry and receiver circuitry may be divided between the transmitter 45a and receiver 45b according to implementation.

Frequency modulation may be used on the transmitter side to characterize the transfer function of the transmission channel including the metamaterial over frequency. However, a continuous carrier wave with a constant frequency may also be used.

On the measurement side (receiver side), it would still be magnitude (amplitude) and phase or I and Q, which would be the most sophisticated and flexible solution. However, with respect to cost, a system with a constant frequency carrier may be preferable. In this case, the frequency is chosen to be in a defined region with respect to the poles and zeros where the phase or amplitude transfer function has a monotonous behavior with respect to the modified property of the metamaterial. Then a local measurement of phase shift or amplitude attenuation is used.

Accordingly, at least one transmission antenna 601 (TX antenna) and at least one receiver antenna 602 (RX antenna) are connected to an RF front end 603 integrated into a chip, which the RF front end may contain all those circuit components that are required for RF signal processing. These circuit components comprise for example a local oscillator (LO), RF power amplifiers, low noise amplifiers (LNA), directional couplers (for example rat-race couplers, circulators, etc.), and mixers for downmixing (or down-converting) the RF signals into baseband or an intermediate frequency band (IF band). The RF front end 603 may—possibly together with further circuit components—be integrated into a chip, which is usually referred to as a monolithic microwave integrated circuit (MMIC).

The example illustrated shows a bistatic (or pseudo-monostatic) radar system with separate RX and TX antennas. In the case of a monostatic radar system, a single antenna would be used both to emit and to receive the electromagnetic (radar) signals. In this case, a directional coupler (for example a circulator) may be used to separate the RF signals to be emitted from the received RF signals (radar echo signals). Radar systems in practice usually have a plurality of transmission and reception channels (TX/RX channels) with a plurality of TX and RX antennas, which makes it possible, inter alia, to measure the direction (DoA) from which the radar echoes are received. In such multiple-input multiple-output (MIMO) systems, the individual TX channels and RX channels in each case usually have an identical or similar structure.

In the case of a frequency-modulated continuous-wave (FMCW) radar system, the RF signals emitted by the TX antenna 601 may be for example in the range of approximately 10 GHz to 500 GHz. However, the frequency bands that are applied here depend on the structures to be used for the generation of the metamaterial target. As mentioned, the RF signal received by the RX antenna 603 comprises the radar echoes (chirp echo signals), that is to say those signal components that are backscattered at one or at a plurality of radar targets. The received RF signal is downmixed for example into baseband (or an IF band) and processed further in baseband by way of analog signal processing (see analog baseband signal processing chain 604). The analog signal processing circuitry 604 essentially comprises filtering and possibly amplifying the baseband signal. The baseband signal is finally digitized (see analog-to-digital converter 605) and processed further in the digital domain. The digital signal processing chain may be implemented at least partly in the form of software that is able to be executed on a processor, for example a microcontroller, a digital signal processor (DSP) 606, or another computer unit. The overall system is generally controlled by way of a system controller 607 that may likewise be implemented at least partly in the form of software that is able to be executed on a processor, such as for example a microcontroller. The RF front end 603 and the analog baseband signal processing chain 604 (optionally also the analog-to-digital converter 605) may be integrated together in a single MMIC (that is to say an RF semiconductor chip). As an alternative, the individual components may also be distributed over a plurality of integrated circuits. A single DSP may receive respective digital receive signals from each of the receive antennas for calculating rotational parameters of the rotatable shaft, including rotational speed, rotational direction, angle, torque, etc.

The DSP 606 is configured to perform the aforementioned phase analysis, amplitude analysis, and/or frequency analysis to determine a rotational parameter (e.g., rotational speed, rotational direction, absolute angular position, and/or torque) of the metamaterial track and/or the rotatable shaft based on the determined amplitude modulation and/or phase modulation. The phase modulation of a received signal may be a phase shift of the received signal with respect to a phase of the transmitted mm-wave (i.e., of the carrier signal). Similarly, the amplitude modulation of a received signal may be an amplitude shift of the received signal with respect to an amplitude of the transmitted mm-wave.

The DSP 606 may be configured to determine a phase shift and/or an amplitude shift of a received signal and translate the shift into a rotational parameter either directly from a single receive signal or in combination with another receive signal (e.g., two phase shifted receive signals are used to determine rotational direction). For example, the DSP 606 may refer to a look-up table provided in memory that stores angular positions or values relative to a specific amplitude modulation and/or phase modulation when the track has a 360° periodical pattern.

In addition, the DSP 606 may analyze a phase shift between two receive signals for determining an absolute angular position as described herein. The DSP 606 may also calculate the rotational speed by analyzing the rate of change in the angular values. Additionally, by obtaining two measurement signals (e.g., two 90° phase shifted signals), a rotation direction of the rotatable target object may also be determined by the DSP 606. In general, two receive signals can be used to achieve a 360° unambiguous measurement range. For a system measuring in a limited range the property of the metamaterial must not necessarily be changed according to a sine/cosine system. For a limited range (e.g., +/−60°), a sine alone would be sufficient.

Metamaterial-based sensors with millimeter (mm)-wave radars as read-out have the potential to overcome many challenges of existing sensor systems. These mm-wave metamaterials represent a novel sensor concept in the fields of torque, speed, and position measurements in both rotational and linear movement sensors. Mm-wave metamaterials are fully telemetric and highly scalable. Due to their high scalability, this concept allows the implementation of dual or multiple measurements in parallel without requiring additional installation space.

In order to maintain high robustness in harsh environment, dual measurement or differential measurement within the sensor may be required. Furthermore, a combination of torque and speed measurement in one sensor provides a direct power flow sensor system.

One or more embodiments provide a method to implement multiple parallel measurements in metamaterial-based sensor systems. The idea is to implement frequency multiplexing and therewith differentiate between the signals in frequency space. The metamaterial structures are designed with different working frequencies by varying their geometrical parameters. Read-out is done either using multiple radar chips with non-overlapping bandwidth or using one radar chip performing frequency modulation. The measuring and the read-out of various measurement parameters such as a rotational speed of the rotational shaft, an absolute angular position of the rotational shaft, a rotation direction of the rotational shaft, and/or a torque applied to the rotational shaft can be performed in parallel by using different arrays of mm-wave structures (e.g., metamaterial tracks) for each measurement parameter. Each measurement parameter is assigned a different working frequency according to its corresponding arrays of mm-wave structures. As a result, an electro-magnetic signal with a frequency within the bandwidth of the target working resonance frequency can be used to measure a corresponding measurement parameter. Different electro-magnetic signals with different frequencies within the bandwidth of their respective target working resonance frequency can be used in parallel to measure the different measurement parameters.

The electro-magnetic signals may be monochromatic or frequency modulated (e.g., a frequency ramp signal) with a correspondingly small bandwidth that only covers one of the target resonance frequencies. For example, In FIG. 7, for example, one could use on frequency modulated transmitter with a bandwidth from 54 GHz to 60 GHz and a second frequency modulated transceiver with a bandwidth from 60 GHz to 66 GHz. In this case, a frequency modulated signal with ramps that change from 54 GHz to 60 GHz, or vice versa, and a frequency modulated signal with ramps that change from 60 GHz to 66 GHz, or vice versa, are generated. Each frequency modulated signal overlaps with a different target resonance frequency and does not overlap with the other target resonance frequency, as will be explained in further detail below.

The sensor effect of metamaterials is based on their characteristic resonance frequency. It is the tuning of this resonance frequency that translates the desired measurand into a tuning of reflected or transmitted radar waves. The characteristic resonance of metamaterials exhibits high Q-factors, also for single layered metamaterials. Thus, a single metamaterial array signal has a narrow bandwidth. Adjustment of the metamaterial array to a shifted resonance frequency with the same Q-factor is achievable. This working frequency is adjusted by varying the size of the elementary structures of the array or by varying the geometric parameters within the elementary structures. The metamaterials are then arranged in arrays comprising a multitude of elementary structures. Further, the working frequency can be adjusted by varying the arrangement of elementary structures within the array.

Figure 7:
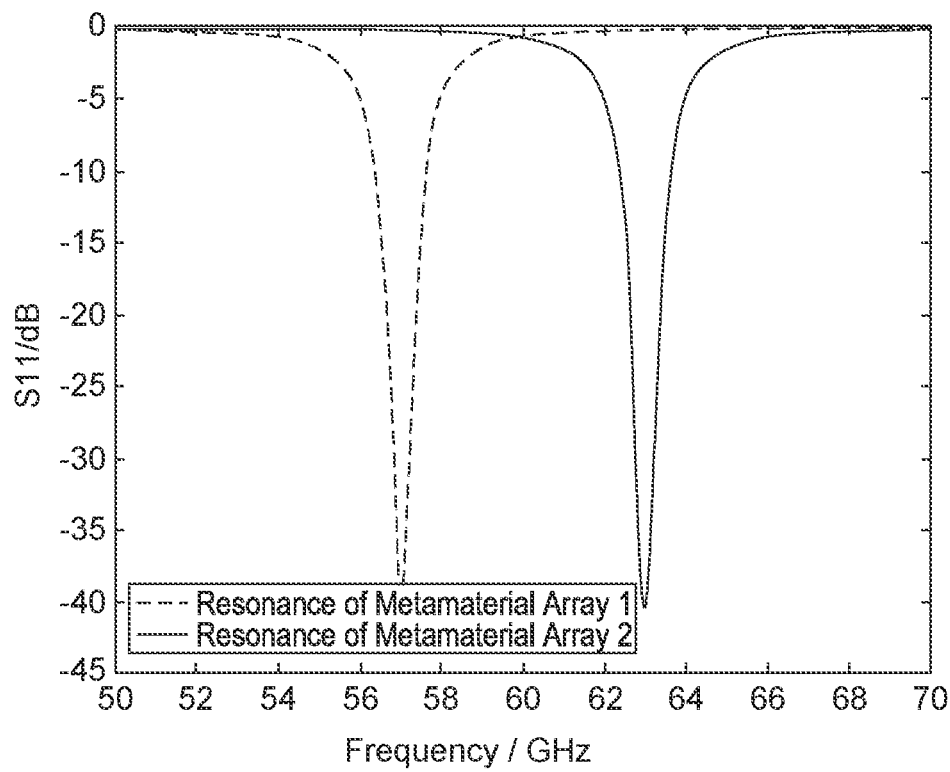
FIG. 7 illustrates a resonance of a first metamaterial array and a resonance of a second metamaterial array, where the two metamaterial arrays have different working resonance frequencies, according to one or more embodiments.

The idea is to fabricate two or more metamaterial arrays with narrow bandwidths of their resonance frequency. The overlap between the two bandwidths is zero or negligible. An exemplary representation of the spectra from two resonances coming from two metamaterial arrays is shown in FIG. 7. Specifically, FIG. 7 illustrates a resonance of a first metamaterial array and a resonance of a second metamaterial array, where the two metamaterial arrays have different working resonance frequencies. A metamaterial array with a certain working resonance frequency reacts strongly to signals that have a frequency within its bandwidth and reacts weakly or not at all to signal having frequencies outside its bandwidth. Thus, each metamaterial array can be used for a different measurand along with an electro-magnetic signal whose frequency targets the working resonance frequency of its target metamaterial array.

Figure 8:
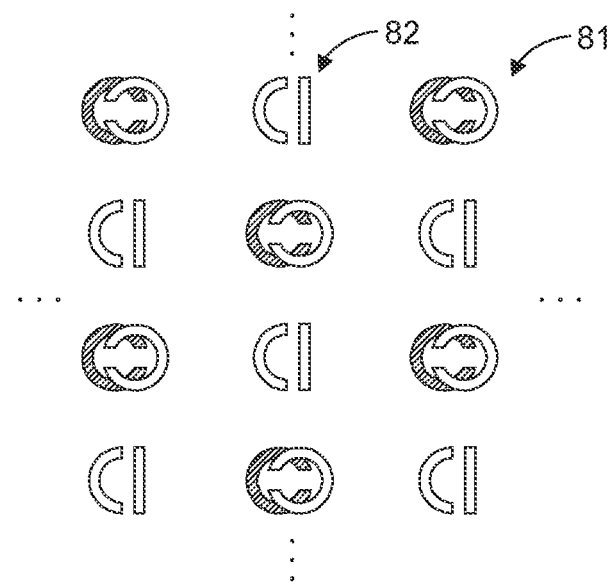
FIG. 8 shows a nested arrangement of two metamaterial arrays according to one or more embodiments.

The metamaterial arrays can be spatially separated as separate metamaterial tracks or nested (e.g., intermixed) within each other. Spatial separation is shown in FIG. 4A, for example. FIG. 8 shows a nested arrangement of two metamaterial arrays, where a first metamaterial array includes a first type of elementary structures 81 and has a first working resonance frequency and a second metamaterial array includes a second type of elementary structures 82 and has a second, different working resonance frequency. Further, this principle can be scaled to a three or more metamaterial arrays, each having different working resonance frequencies. The metamaterial arrays may be arranged on a same carrier structure, with the exception of torque—which requires at least one metamaterial array to be arranged on a second carrier structure.

Two metamaterial arrays used for torque measurements react as a mutually coupled structure with a common resonance frequency that results from the mutual coupling to generate a single measurement signal in response to receiving an electro-magnetic signal within the bandwidth of their working resonance frequency. For example, metamaterial arrays 55 and 56 and are mutually coupled to each other by a torque dependent coupling, thereby forming a mutually coupled structure with a common resonance frequency that is sensitive to a torque dependent angular shift between metamaterial array 55 and metamaterial array 56. Together, the metamaterial arrays 55 and 56 convert an electro-magnetic transmit signal into an electro-magnetic receive signal based on a torque applied to the rotational shaft that causes the torque dependent angular shift. In this way the torque can be measured using an electro-magnetic transmit signal whose frequency is within the bandwidth of the target working resonance frequency of the mutually coupled structure formed by metamaterial arrays 55 and 56 (i.e., within the bandwidth of the common resonance frequency).

Two metamaterial arrays used for measuring a rotation direction may have different working resonance frequencies so that they can be measured simultaneously, in parallel. In other words, to separate measurement signals are acquired, one from each of the metamaterial arrays. Thus, two electro-magnetic transmit signals are transmitted—one with a frequency within the bandwidth of the working resonance frequency of a metamaterial array 43 and one with a frequency within the bandwidth of the working resonance frequency of a metamaterial array 44, for example. In response, each metamaterial array generates its own measurement signals (i.e., electro-magnetic receive signal) in response to receiving the electro-magnetic transmit signal within its working resonance frequency. These measurement signals from the two metamaterial arrays can then be evaluated to detect their respective zero-crossings and a phase shift between the two measurement signals for determining the rotation direction.

Thus, metamaterial arrays 43 and 44 may be configured with different working resonance frequencies in order to measure different rotational parameters (e.g., rotation speed or absolute rotation angle) or to measure a same rotational parameter, such as rotation direction. Additional metamaterial arrays may be added to the carrier structure 40 to measure additional rotational parameters with each additional metamaterial array having a different, non-overlapping working resonance frequency with respect to the other working resonance frequencies.

Additionally, the mutually coupled structure formed by metamaterial arrays 55a and 56a is configured with a common working resonance frequency to measure torque (e.g., a first torque measurement), the mutually coupled structure formed by metamaterial arrays 55b and 56b is configured with a common working resonance frequency to measure torque (e.g., a second torque measurement) but has a common working resonance frequency that is different from the common working resonance frequency of the mutually coupled structure formed by metamaterial arrays 55a and 56a so that measurements can be performed in parallel. Additionally, metamaterial arrays 55c and 56c are used to measure additional measurands and thus have different working resonance frequencies from each other and from metamaterial arrays 55a, 56a, 55b, and 56b.

Read-out is done either with multiple transceivers (e.g., different radar chips), each working in one of the metamaterial bandwidths, or with one transceiver performing frequency modulation to transmit electro-magnetic signals having different frequencies that target different working resonance frequencies in order to target different metamaterial arrays or measurands. Stepped frequency modulation is also applicable.

FIGS. 9A-9F illustrate cross-sectional views of different possible transceiver or transmitter/receiver implementations for different arrangements of metamaterial arrays according to one or more embodiments.

Figure 9A:
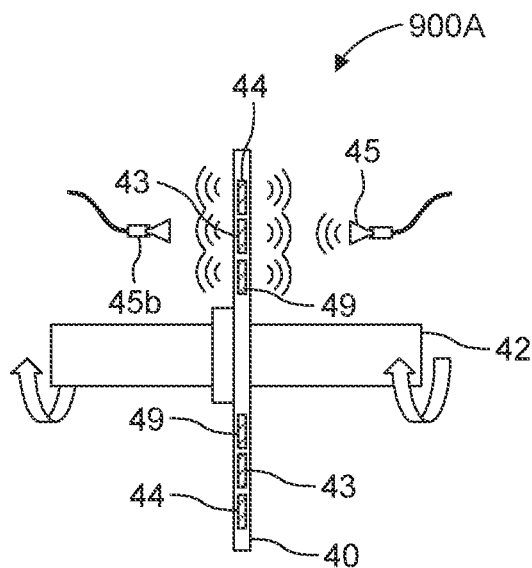
FIGS. 9A-9F illustrate cross-sectional views of different possible transceiver or transmitter/receiver implementations for different arrangements of metamaterial arrays according to one or more embodiments.

FIG. 9A illustrates a rotation sensor system 900A according to one or more embodiments. The rotation sensor system 900A includes a rotational shaft 42, a carrier structure 40, and three metamaterial arrays 43, 44, and 49 arranged as spatially separate metamaterial tracks. The rotation sensor system 900a also includes a signal transceiver 45 that transmits electro-magnetic transmit signals at different frequencies or frequency ranges via frequency multiplexing and receives the corresponding electro-magnetic receive signals from a target metamaterial array 43, 44, or 49. Alternatively, the transceiver 45 may be used solely as a transmitter and a receiver 45b is provided to receive the corresponding electro-magnetic receive signals. Because each electro-magnetic transmit signal is partially transmitted and partially reflected by its target metamaterial array, thereby converting the electro-magnetic transmit signal into an electro-magnetic receive signal, the transmitter and receiver may be placed on the same side of the carrier structure 40 or on opposite sides of the carrier structure, as discussed above.

Metamaterial array 43 is configured with a first working resonance frequency, metamaterial array 44 is configured with a second working resonance frequency, and metamaterial array 49 is configured with a third working resonance frequency. Metamaterial array 43 may be used to measure an absolute angular position of the rotational shaft 42, metamaterial array 44 may be used to measure a rotation direction of the rotational shaft 42, and metamaterial array 49 may be used to measure a rotational speed of the rotational shaft 42 or to measure a distance between the carrier structure 40 and the transceiver 45 to use in compensating other measurement signals due to, for example, vibration. Of course, the target measurand for each metamaterial array can be any of the parameters and can be configured in any combination or order.

The metamaterial array 43 is configured to convert a first electro-magnetic transmit signal having a frequency in the bandwidth of its working resonance frequency into a first electro-magnetic receive signal that the receiver (e.g., DSP 606) uses to measure a first rotational parameter. Due to their different working resonance frequencies, metamaterial arrays 44 and 49 respond weakly to the first electro-magnetic transmit signal or not at all in a way that any signals generated by them in response to the first electro-magnetic transmit signal are filtered out or ignored by the receiver (e.g., DSP 606).

The metamaterial array 44 is configured to convert a second electro-magnetic transmit signal having a frequency in the bandwidth of its working resonance frequency into a second electro-magnetic receive signal that the receiver (e.g., DSP 606) uses to measure a second rotational parameter. Due to their different working resonance frequencies, metamaterial arrays 43 and 49 respond weakly to the second electro-magnetic transmit signal or not at all in a way that any signals generated by them in response to the second electro-magnetic transmit signal are filtered out or ignored by the receiver (e.g., DSP 606).

The metamaterial array 49 is configured to convert a third electro-magnetic transmit signal having a frequency in the bandwidth of its working resonance frequency into a third electro-magnetic receive signal that the receiver (e.g., DSP 606) uses to measure a third rotational parameter. Due to their different working resonance frequencies, metamaterial arrays 43 and 44 respond weakly to the third electro-magnetic transmit signal or not at all in a way that any signals generated by them in response to the third electro-magnetic transmit signal are filtered out or ignored by the receiver (e.g., DSP 606).

As a result, the transceiver 45 can perform frequency multiplexing to transmit electro-magnetic signals at the three metamaterial arrays 43, 44, 49, where all three metamaterial arrays receive each of the electro-magnetic signals but only one of the metamaterial arrays is configured to respond strongly to an electro-magnetic signal due to an overlap of the electro-magnetic signal's frequency with the bandwidth of the working resonance frequency of the metamaterial array of interest. Here, different measurands are sequentially measured by the transceiver 45 based on the frequency multiplexing scheme.

In some cases, the three metamaterial arrays 43, 44, 49 may receive an electro-magnetic signal and produce their own respective electro-magnetic receive signals therefrom. For example, the electro-magnetic signal may be a frequency ramp signal that is continuously generated (e.g., as an FMCW signal) over a range of frequencies. The metamaterial arrays 43, 44, 49 strongly react to the frequency ramp signal when the frequency of the ramp signal is within the bandwidth of its working resonance frequency, thereby producing a strong electro-magnetic receive signal that can be detected and measured by the receiver. The receiver can filter out the weaker signals, for example, that do not exceed a threshold.

Figure 9B:
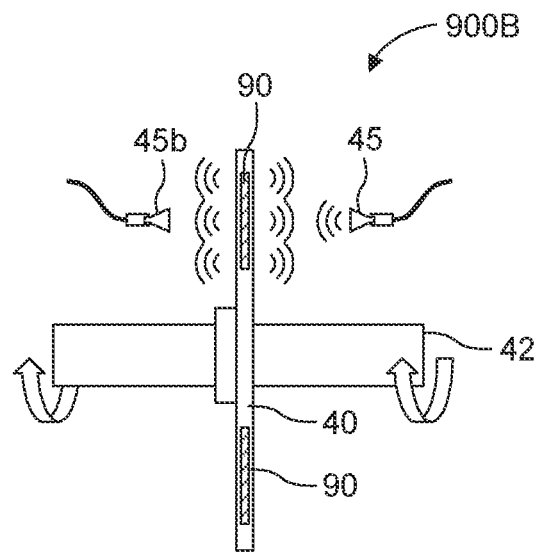

FIG. 9B illustrates a rotation sensor system 900B according to one or more embodiments. The rotation sensor system 900B is similar to the rotation sensor system 900A, with the exception that the three metamaterial arrays 43, 44, and 49 are nested within each other and are intermixed within a single metamaterial track 90 arranged around the rotation shaft 42 on the carrier structure 40. The rotation sensor system 900B operates with a similar frequency multiplexing scheme described above in reference to the rotation sensor system 900A.

Figure 9C:
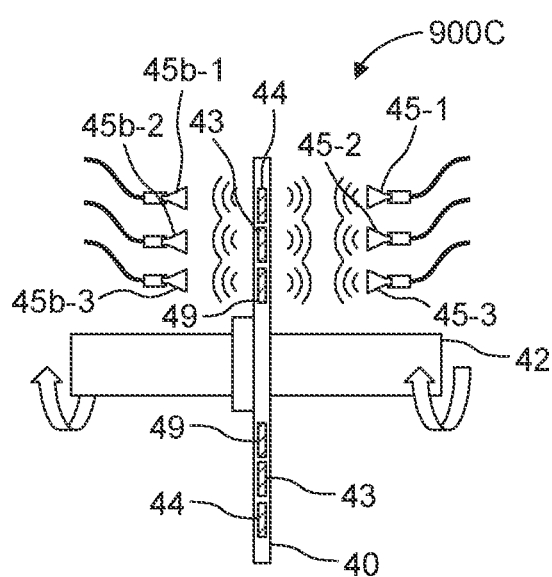

FIG. 9C illustrates a rotation sensor system 900C according to one or more embodiments. The rotation sensor system 900C is similar to the rotation sensor system 900A with the exception that multiple transceivers 45-1, 45-2, and 45-3 are used or multiple transmitter/receiver pairs are used with the receives 45b-1, 45b-2, and 45b-3 arranged on the opposite side of the carrier structure 40 than their transmitter counterparts.

Transceiver 45-1 is configured to target metamaterial array 44 with electro-magnetic transmit signals. The transceiver 45-1 is configured to transmit electro-magnetic transmit signals having a frequency in the bandwidth of the working resonance frequency of metamaterial array 44 in order to measure and process electro-magnetic receive signals therefrom.

Transceiver 45-2 is configured to target metamaterial array 43 with electro-magnetic transmit signals. The transceiver 45-2 is configured to transmit electro-magnetic transmit signals having a frequency in the bandwidth of the working resonance frequency of metamaterial array 43 in order to measure and process electro-magnetic receive signals therefrom.

Transceiver 45-3 is configured to target metamaterial array 49 with electro-magnetic transmit signals. The transceiver 45-3 is configured to transmit electro-magnetic transmit signals having a frequency in the bandwidth of the working resonance frequency of metamaterial array 49 in order to measure and process electro-magnetic receive signals therefrom.

The receivers are sensitive to or tuned to frequencies that are in the bandwidth of the working resonance frequency of their target metamaterial array.

This configuration enables measurements to be performed simultaneously, in parallel. Additionally, cross-talk between transmitted and received signals is mitigated due to the electro-magnetic transmit signals transmitted by the transceivers having different frequencies or frequency ranges and due to the metamaterial arrays or mutually coupled structures having different, non-overlapping or substantially non-overlapping working resonance frequencies.

Figure 9D:
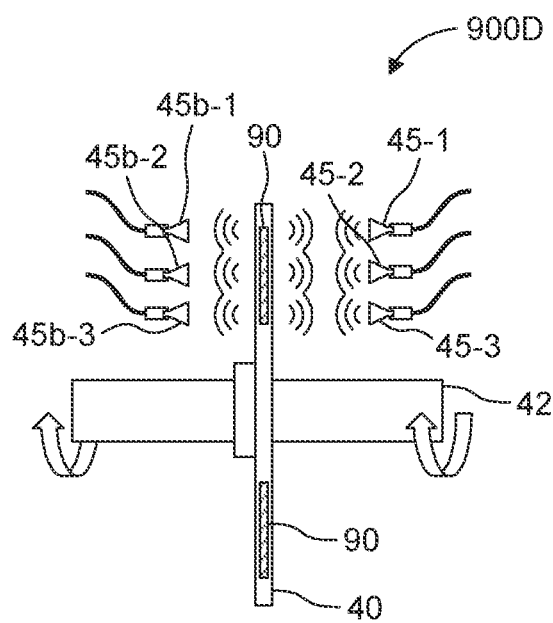

FIG. 9D illustrates a rotation sensor system 900D according to one or more embodiments. The rotation sensor system 900D is similar to the rotation sensor system 900C, with the exception that the three metamaterial arrays 43, 44, and 49 are nested within each other and are intermixed within a single metamaterial track 90 arranged around the rotation shaft 42 on the carrier structure 40. The rotation sensor system 900D operates with a similar frequency multiplexing scheme described above in reference to the rotation sensor system 900C.

Figure 9E:
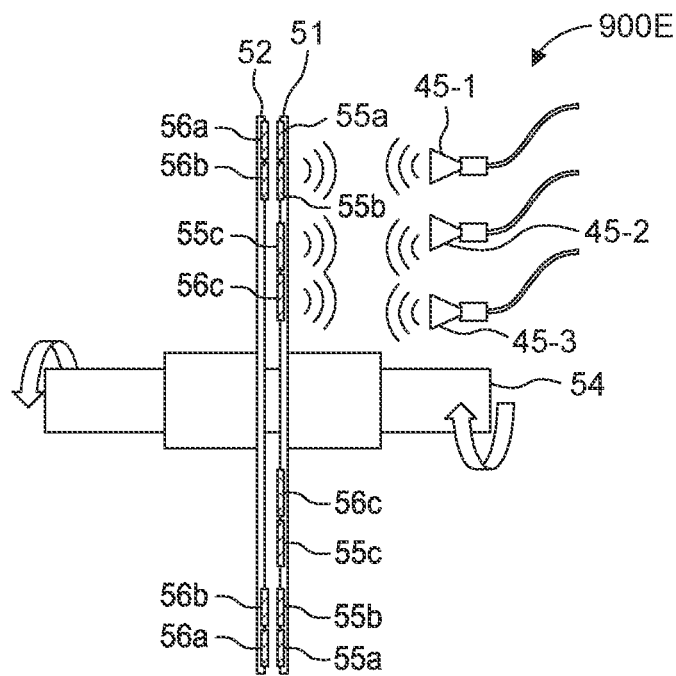

FIG. 9E illustrates a rotation sensor system 900E according to one or more embodiments. The rotation sensor system 900E has two carrier structures 51 and 52 in order to measure torque applied to rotational shaft 54. Metamaterial arrays 55a, 55b, 55c, and 56c are arranged on carrier structure 51 and are spatially separated into different metamaterial tracks. Each of the metamaterial arrays 55a, 55b, 55c, and 56c have different non-overlapping or substantially non-overlapping working resonance frequencies. Metamaterial arrays 56a and 56b are arranged on carrier structure 52 and are spatially separated into different metamaterial tracks. Metamaterial array 56c could also be arranged on carrier structure 52 instead of on carrier structure 51. Each of the metamaterial arrays 56a, 56b, and 56c have different non-overlapping or substantially non-overlapping working resonance frequencies. However, metamaterial array 56a a mutual working resonance frequency with metamaterial array 55a and metamaterial array 56b has a mutual working resonance frequency with metamaterial array 55b. In this way, metamaterial arrays 55a and 56a form a mutually coupled structure and metamaterial arrays 55b and 56b form another mutually coupled structure, and both mutually coupled structures can be used to measure torque.

Transceiver 45-1 is configured to mutually coupled metamaterial arrays 55a and 56a and mutually coupled metamaterial arrays 55b and 56b by using frequency multiplexing to serially transmit electro-magnetic transmit signals at different frequencies in order to target one of the two mutually coupled pairs. In particular, the transceiver 45-1 is configured to transmit electro-magnetic transmit signals having a frequency in the bandwidth of the working resonance frequencies of metamaterial arrays 55a and 56a in order to measure and process electro-magnetic receive signals therefrom. Additionally, the transceiver 45-1 is configured to transmit electro-magnetic transmit signals having a frequency in the bandwidth of the working resonance frequencies of metamaterial arrays 55b and 56b in order to measure and process electro-magnetic receive signals therefrom.

Transceiver 45-2 is configured to target metamaterial array 55c with electro-magnetic transmit signals. The transceiver 45-2 is configured to transmit electro-magnetic transmit signals having a frequency in the bandwidth of the working resonance frequency of metamaterial array 55c in order to measure and process electro-magnetic receive signals therefrom. This measurement can be performed in parallel with a measurement that targets mutually coupled metamaterial arrays 55a and 56a or mutually coupled metamaterial arrays 55b and 56b.

Transceiver 45-3 is configured to target metamaterial array 55c with electro-magnetic transmit signals. The transceiver 45-3 is configured to transmit electro-magnetic transmit signals having a frequency in the bandwidth of the working resonance frequency of metamaterial array 55c in order to measure and process electro-magnetic receive signals therefrom. This measurement can be performed in parallel with a measurement that targets mutually coupled metamaterial arrays 55a and 56a or mutually coupled metamaterial arrays 55b and 56b.

The receivers are sensitive to or tuned to frequencies that are in the bandwidth of the working resonance frequency of their target metamaterial array(s).

Figure 9F:
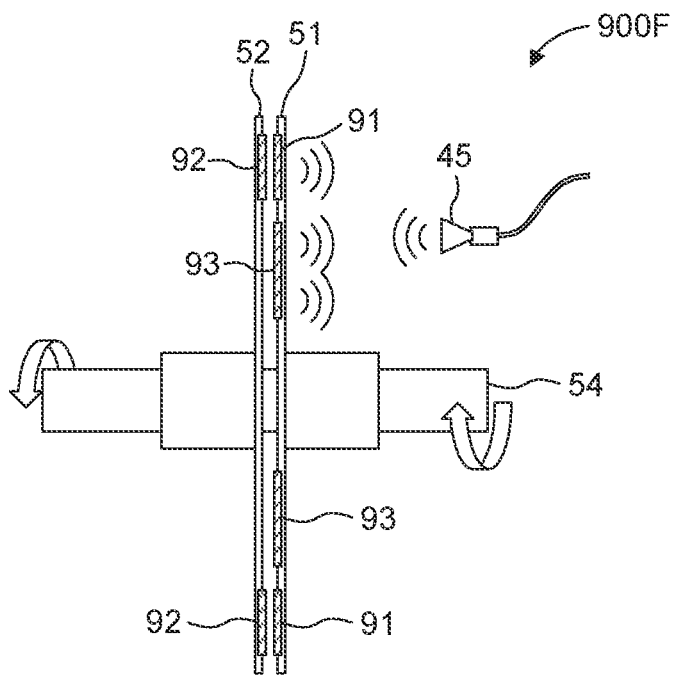

FIG. 9F illustrates a rotation sensor system 900F according to one or more embodiments. The rotation sensor system 900F is similar to the rotation sensor system 900E, with the exception that metamaterial arrays 55a and 55b are nested within each other and are intermixed within a single metamaterial track 91 arranged around the rotation shaft 54 on the carrier structure 51, metamaterial arrays 56a and 56b are nested within each other and are intermixed within a single metamaterial track 92 arranged around the rotation shaft 54 on the carrier structure 52, and metamaterial arrays 55c and 56c are nested within each other and are intermixed within a single metamaterial track 93 arranged around the rotation shaft 54 on the carrier structure 51.

Additionally, one or more transceivers is provided. Here, a single transceiver 45 is provided that performs frequency multiplexing to generate electro-magnetic transmit signals at different frequencies to target different working resonance frequency bandwidths. In this way, different metamaterial arrays or different mutually coupled metamaterial arrays can be targeted for measurement without cross-talk.

In some cases, the metamaterial arrays may receive an electro-magnetic signal and produce their own respective electro-magnetic receive signals therefrom. For example, the electro-magnetic signal may be a frequency ramp signal that is continuously generated (e.g., as an FMCW signal)

over a range of frequencies. The metamaterial arrays strongly react to the frequency ramp signal when the frequency of the ramp signal is within the bandwidth of its working resonance frequency, thereby producing a strong electro-magnetic receive signal that can be detected and measured by the receiver. The receiver can filter out the weaker signals, for example, that do not exceed a threshold.

Figure 10A:
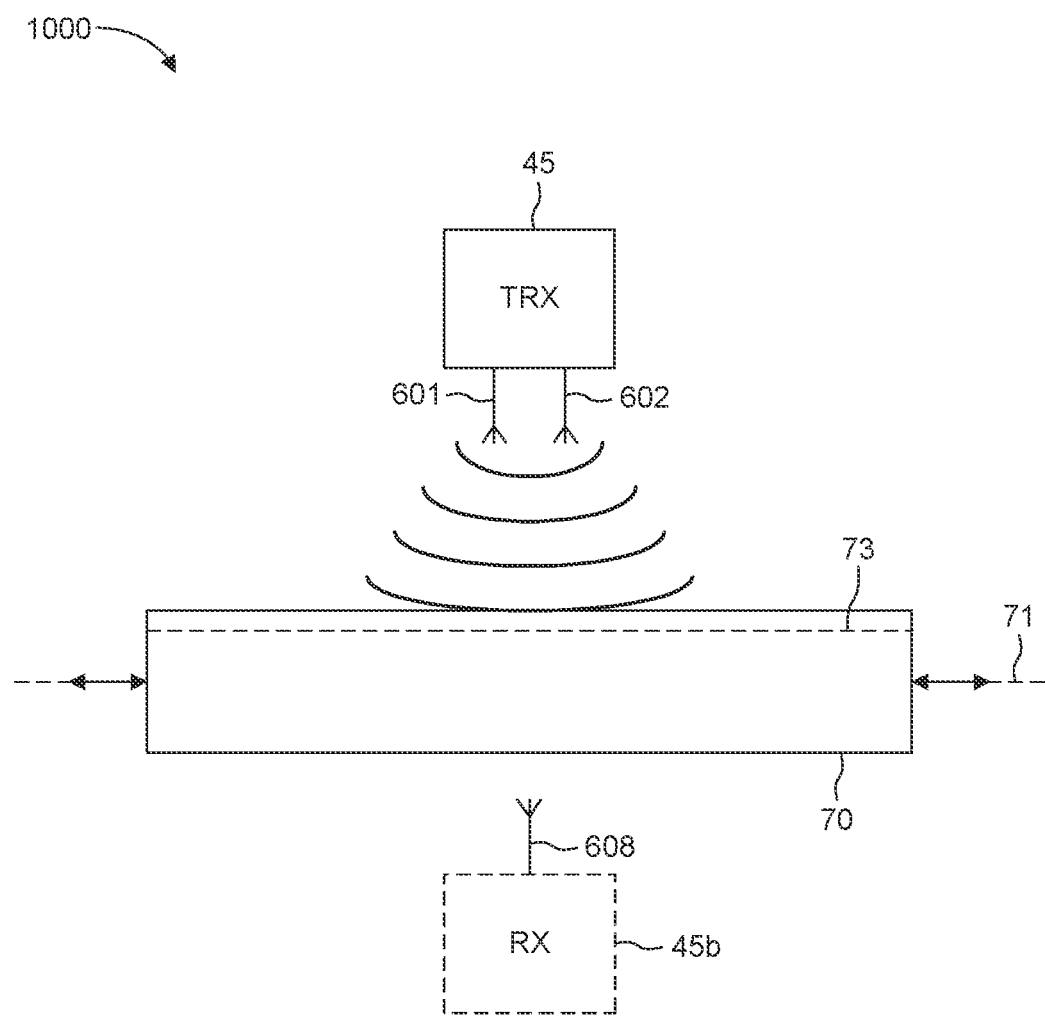
FIGS. 10A and 10B illustrate a cross-section view and a plan view, respectively, of a linear position sensor system according to one or more embodiments.
Figure 10B:
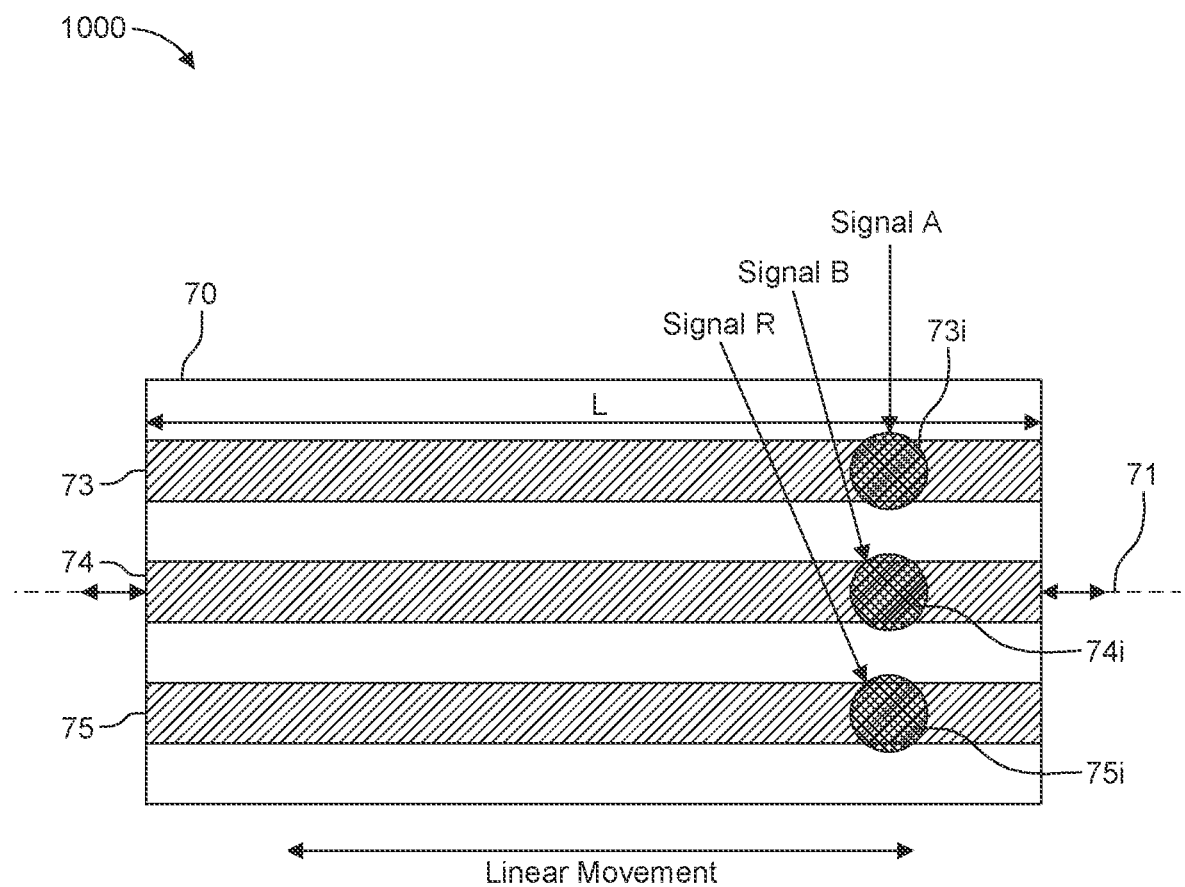

Similar principles described above also apply to a linear position sensor system. In particular, FIGS. 10A and 10B illustrate a cross-section view and a plan view, respectively, of a linear position sensor system 1000 according to one or more embodiments. In this case, a linear movable target object 70 configured to move linearly in a linear moving direction on a linear axis 71. Three mm-wave metamaterial arrays 73-75 are arranged in spatially separated tracks that are coupled to the linear movable target object 70 such that the mm-wave metamaterial tracks 73-75 each extend lengthwise along the linear moving direction. Alternatively, the metamaterial arrays 73-75 can be nested within each other in a single metamaterial track. In either case, each of the metamaterial arrays 73-75 have different non-overlapping or substantially non-overlapping working resonance frequencies.

The mm-wave metamaterial array 73 is made up of a first array of elementary structures having at least one first characteristic that changes along the mm-wave metamaterial array in the linear moving direction, similar to the way the configuration of the array of elementary structures changes around the perimeter of the mm-wave metamaterial array in the previous examples related to rotational position sensing. The elementary structures of mm-wave metamaterial array 73 may, for example, have an L/N periodical pattern where the characteristic change repeats N times over the length L of the mm-wave metamaterial array. N may be an integer equal to or greater than one. The length L of the mm-wave metamaterial array 73 may also equal the length of the linear movable target object 70 or a range of linear motion that the linear movable target object 70 undergoes. The mm-wave metamaterial array 73 generates a receive signal A (e.g., a reflection signal) when an mm-wave beam is incident thereon at the illuminated segment 73i of the array and has a frequency within the bandwidth of the working resonance frequency of metamaterial array 73. The metamaterial array 73 may be used to measure a linear speed, a movement direction, or an absolute linear position of the linear movable target object 70.

The mm-wave metamaterial array 74 is made up of a second array of elementary structures having at least one second characteristic that changes along the mm-wave metamaterial array in the linear moving direction, similar to the way the configuration of the array of elementary structures changes around the perimeter of the mm-wave metamaterial array in the previous examples related to rotational position sensing. The elementary structures of mm-wave metamaterial array 74 may, for example, have an L/N periodical pattern where the characteristic change repeats N times over the length L of the mm-wave metamaterial array. N may be an integer equal to or greater than one. The mm-wave metamaterial array 74 generates a receive signal B (e.g., a reflection signal) when an mm-wave beam is incident thereon at the illuminated segment 74i of the array and has a frequency within the bandwidth of the working resonance frequency of metamaterial array 74. The periodical pattern of mm-wave metamaterial array 74 may be linearly shifted in the linear moving direction relative to the periodical pattern of mm-wave metamaterial array 73 such that receive signal B is shifted 90° with respect to receive signal A. The metamaterial array 74 may be used to measure a different measurand from metamaterial array 73, including a linear speed or an absolute linear position of the linear movable target object 70 or may be used in conjunction with metamaterial array 73 to measure specific measurand, including a movement direction of the linear movable target object 70.

The mm-wave metamaterial array 75 is made up of a third array of elementary structures having at least one third characteristic that changes along the mm-wave metamaterial array in the linear moving direction, similar to the way the configuration of the array of elementary structures changes around the perimeter of the mm-wave metamaterial array in the previous examples related to rotational position sensing. The elementary structures of mm-wave metamaterial array 75 may, for example, have a single periodical pattern that extends the length L of the mm-wave metamaterial array such that the reflectivity and/or transmittivity of the array is unique for each discrete linear position. Thus, the configuration of the array of elementary structures is unique to a linear position of the mm-wave metamaterial array on the linear movable target object 70.

The mm-wave metamaterial array 75 generates a receive signal R (e.g., a reflection signal) when an mm-wave beam is incident thereon at the illuminated segment 75i of the array and has a frequency within the bandwidth of the working resonance frequency of metamaterial array 75. Because only a signal period of characteristic change is encoded onto array 75, the phase shift and/or amplitude shift of the receive signal R is unique to the absolute linear position of the linear movable target object 70.

Alternatively, the third array of elementary structures of the metamaterial array 75 may have a configuration that does not change along the length of the mm-wave metamaterial array, similar to the array shown in FIG. 2A and may be used to measure a distance between the array and the transceiver in order to compensate the other measurement signals for vibration.

The linear position sensor system 1000 further includes at least one of a transceiver, transmitter, and/or receiver combination. For example, the linear position sensor system 1000 may include a transceiver 45 having a transmitter antenna 601 configured to transmit mm-waves (i.e., electro-magnetic transmit signals) at the metamaterial arrays 73-75 at different frequencies. The transceiver 45 also includes a receiver antenna 602 configured to receive a partially-reflected mm-waves (i.e., electro-magnetic receive signals A, B, and R) from the metamaterial arrays 73-75.

Alternatively, the linear position sensor system 1000 may include receiver 45b that includes receiver antenna 608 that is configured to receive a partially transmitted mm-waves (i.e., electro-magnetic receive signals A, B, and R) as a result of the transmitted mm-waves interacting with (i.e., being partially absorbed by and transmitted through) the metamaterial arrays 73-75. Additional transceivers, transmitters, and/or receivers can be used for transmitting to and receiving from targets metamaterial arrays 73-75 in a similar manner discussed above in reference to FIGS. 9A-9F, and serial and/or parallel measurements are possible depending on the transceiver/transmitter/receiver configuration used.

The receiver circuitry (e.g., DSP 606) either at transceiver 45 or at receiver 45b is configured to receive the electro-magnetic receive signals A, B, and R and determine a linear speed, movement direction, and/or absolute linear position of the linear movable target object 70 based on the received electro-magnetic signals A, B, and/or R.

For example, the mm-wave metamaterial array 73 may be configured to modify an electro-magnetic transmit signal, thereby producing the electro-magnetic receive signal A having a property unique to the linear position of the mm-wave metamaterial array at which the electro-magnetic transmit signal is incident, and at least one processor is configured to evaluate the property of the received electro-magnetic receive signal A, and determine the linear speed of the linear movable target object based on the evaluated property. The at least one processor is further configured to receive the electro-magnetic receive signal B and determine a linear movement direction of the linear movable target object 70 based on the received electro-magnetic signals A and B and, more particularly, based on the positive or negative phase shift thereof. The at least one processor is further configured to receive the electro-magnetic receive signal R and determine an absolute linear position of the linear movable target object 70 based on the received electro-magnetic signal R according to a unique phase shift and/or amplitude shift that corresponds to the linear position of the linear movable target object 70.

In some cases, the metamaterial arrays 73-75 may receive an electro-magnetic signal and produce their own respective electro-magnetic receive signals therefrom. For example, the electro-magnetic signal may be a frequency ramp signal that is continuously generated (e.g., as an FMCW signal) over a range of frequencies. The metamaterial arrays strongly react to the frequency ramp signal when the frequency of the ramp signal is within the bandwidth of its working resonance frequency, thereby producing a strong electro-magnetic receive signal that can be detected and measured by the receiver. The receiver can filter out the weaker signals, for example, that do not exceed a threshold.

In addition, torque sensors for powertrain components are in great demand as they would provide monitoring of true power transfer and thus open up new possibilities for efficiency enhancement and safety improvement. Metamaterial-based mm-wave torque sensors have the potential to meet the requirements within powertrains, such as limited space, telemetric read-out and robustness in harsh environment (e.g., abrasion, dust, oil, fumes, electromagnetic interferences). One or more embodiments provides a robust, low power and low-cost system for metamaterial-based mm-wave torque measurement, static or dynamic, using a quadrature continuous-wave (QCW) mm-wave (e.g., radar) transceiver. It is scalable over a broad range of working frequencies, from a few GHz to several hundred GHz. The QCW based sensor can be further applied to other rotational and linear movement sensors to measure various rotational parameters or linear movement parameters that are robust against vibrations and other interferences that may cause the variations in distance between the transceiver and the target object that need to be accounted for to acquire accurate measurements.

Figure 11:
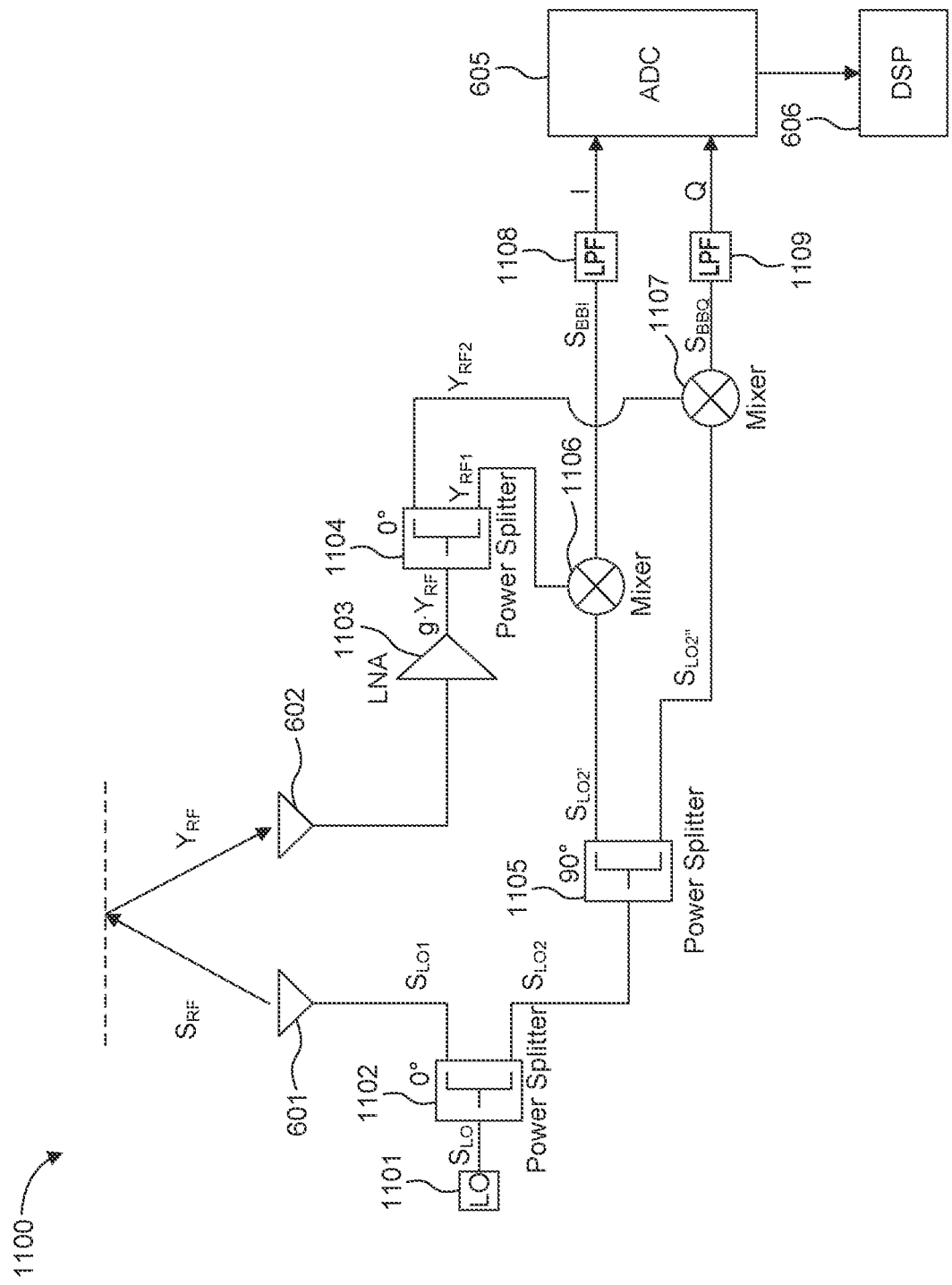
FIG. 11 illustrates a schematic block diagram of a QWC radar transceiver according to one or more embodiments.

FIG. 11 illustrates a schematic block diagram of a QWC radar transceiver 1100 according to one or more embodiments. The QWC radar transceiver 1100 is one type of transceiver that may be used as transceiver 45 in any of the above-described embodiments. The benefits of using a QWC radar transceiver will be described below.

The QCW radar transceiver 1100 is a direct down conversion transceiver where the received signal is divided into in-phase and quadrature (IQ) demodulated signals. The direct down conversion allows measurements of phase or amplitude shifts caused by a target object (e.g., one or more mm-wave metamaterial arrays) with simple and low-cost radar components. Additionally, a QCW radar transceiver may overcome what is referred to as a "null point" issue. A null point issue occurs when the absolute distance to the target object causes a phase shift equal to an odd multiple of $\pi/2$. The null point occurs if the distance between antenna and metamaterial is close to an uneven multiple of half the wavelength of the mm-waves. This issue is completely avoided using I/Q demodulation of the received signal, as described herein.

Similar to that described above with respect to transceiver 45, the QCW radar transceiver 1100 is used to measure the change in reflection or transmission of the received signal relative to the transmitted signal (e.g., a phase shift or an amplitude shift), which is caused by a rotational parameter of a rotational shaft (e.g., shaft 42 or 54). The rotational parameter may be rotational angle, rotational speed, rotational direction, or rotational torque. In principle, the overall QCW radar transceiver 1100 can act as an envelope detector or amplitude modulation (AM) detector, whereby the modulation comes from the interaction of the transmit signal with the metamaterial. For example, the QCW radar transceiver 1100 includes a transmitter antenna 601 configured to transmit a continuous wave towards at least one metamaterial track, and the at least one metamaterial track is configured to convert the continuous wave into a receive signal based on a rotational parameter of the rotational shaft. The QCW radar transceiver 1100 further includes a receiver antenna 602 that is configured to receive the receive signal. Through I/Q demodulation, the QCW radar transceiver 1100 is configured to acquire a measurement of both phase and amplitude of the receive signal, and determine a measurement value for the rotational parameter of the rotational shaft based on the measurement (e.g., based on the phase shift or amplitude shift relative to the transmitted continuous wave).

The RF front end of the QCW radar transceiver 1100 comprises a local oscillator 1101 (LO) that generates an RF oscillator signal $S_{LO}$. The RF oscillator signal $S_{LO}$ is also referred to as LO signal. In radar applications, the LO signal is usually in the super high frequency (SHF) or extremely high frequency (EHF) band, e.g., in the range from 76 GHz to 81 GHz. A fair number of radar systems also operate in the 24 GHz ISM band (industrial, scientific and medical band). The LO signal $S_{LO}$ is processed both in the transmission signal path (in the TX channel) and in the received signal path (in the RX channel).

The transmission signal SRF transmitted by the TX antenna 601 is generated by amplifying the LO signal SLO, for example by means of the RF power amplifier, and is therefore merely an amplified and possibly phase-shifted version of the LO signal SLO. The output of the amplifier can be coupled to the TX antenna 601 (in the case of a bistatic/pseudo-monostatic radar configuration). The received signal YRF received by the RX antenna 602 is supplied to the receiver circuit in the RX channel and hence to the RF ports of an IQ mixer that includes two mixers 1106 and 1107. In the present example, the RF received signal YRF (antenna signal) is pre-amplified by means of the amplifier 1103 (gain g). The mixers 1106 and 1107 thus receive the amplified RF received signal g·YRF. The amplifier 1103 can be, for example, a low-noise amplifier (LNA).

The mixers 1106 and 1107 receive the amplified RF received signal g·YRF from a power splitter 1104 that is configured to split the amplified RF received signal g·YRF into two equivalent signals YRF1 and YRF2 with equal power. In this example, the power splitter 1104 may be a zero degree power splitter. Both signals YRF1 and YRF2 are representative of g·YRF, but with divided power.

The reference port of each mixer 1106 and 1107 is supplied with the LO signal SLO via two power splitters 1102 and 1105, so that the mixers 1106 and 1107 downconverts their respective RF received signals YRF1 and YRF2 to baseband. The power splitter 1102 may be a zero degree power splitter that splits that LO signal SLO into two equivalent signals: one LO signal SLO1 for generating the transmission signal SRF (SLO1) and the other LO signal SLO2 used for IQ demodulation at the receiver channel. Both signals SLO1 and SLO2 are representative of SLO, but with divided power. The power splitter 1105 may be a 90 degree power splitter that splits that LO signal SLO into two equivalent signals, SLO2' and SLO2", that are 90° phase shifted from each other. For example, power splitter 1105 may generate SLO2' to be used by mixer 1106 to demodulate signal YRF1 into a baseband signal SBBI (i.e., an in-phase demodulated signal or, simply, an I signal) and power splitter 1105 may generate SLO2" to be used by mixer 1107 to demodulate signal YRF2 into a baseband signal SBBQ (i.e., a quadrature demodulated signal or, simply, a Q signal). The conversion in baseband can take place in one stage (that is to say from the RF band directly to baseband) or via one or more intermediate stages (that is to say from the RF band to an intermediate-frequency band and on to baseband). Accordingly, the mixer stage contains an IQ mixer that generates two baseband signals (in-phase and quadrature signals) that can be interpreted as a real part and an imaginary part of a complex baseband signal.

Both baseband signals SBBI and SBBQ may be passed through respective low-pass filters (LPFs) 1108 and 1109 to remove any unwanted signal components therefrom, such as undesirable sidebands and image frequencies, so that the in-phase signal I is a DC value of baseband signal SBBI and the quadrature signal Q is a DC value of the baseband signal SBBQ. The in-phase signal I and the quadrature signal Q are then provided to the DSP 606, which uses both signals to perform a measurement on a rotational parameter of the shaft. For example, the DSP 606 may calculate the phase or the amplitude or both of RF received signal YRF via digital samples of the I and Q signals acquired by ADC 605.

The ability to adjust the distance between the transceiver 1100 and the metamaterial with high precision would enable the received baseband signals to be at an optimum working point. The optimal working point means that a small variation of the argument of the cosine causes a large variation of the overall cosine function. However, when it is not possible to adjust the distance between transceiver and metamaterial with high precision, one cannot ensure to operate in the optimal working point. This is overcome by implementing I/Q demodulation and using both the I and the Q demodulated signals for the measurement. To obtain the phase angle, containing the phase modulation caused by the metamaterial, a possible I/Q demodulation method is to implement arctan demodulation. The phase angle $\phi$ can be ascertained using the arc-tangent function (also referred to as arctan, atan or $\tan^{-1}$), in accordance with Equation 1:

$$\phi = \tan^{-1}\frac{I}{Q} = \theta_{MM} + \frac{4\pi d}{\lambda},\qquad\text{Eq. 1}$$

where $\theta_{MM}$ is the phase modulation caused by the metamaterial and d is the distance between the transceiver 1100 and the targeted metamaterial track. In other words, $\theta_{MM}$ is the phase shift of the receive signal YRF relative to the transmit signal SRF after the transmit signal SRF interacts with the metamaterial. The term $4\pi d/\lambda$ is the phase shift due to path length d between the transceiver 1100 and the receiver antenna 602 (including the metamaterial arranged along the path).

The absolute amplitude A, containing the amplitude modulation caused by the metamaterial, is calculated in accordance with Equation 2:

$$A=\sqrt{I^2+Q^2}\qquad\text{Eq. 2.}$$

To apply Equations 1 and 2, both the I and Q signals first have to be normalized. It is of course possible to evaluate both the absolute amplitude and the phase angle to obtain the complete complex baseband signal. This provides information from the metamaterial modulation of both the amplitude and phase modulation of the received signal. It is possible to exploit this information to make the sensor more robust at the cost of additional signal processing.

Shocks or vibrations lead to small changes or variations in distance between the transceiver 1100 to the target metamaterial track(s). DC offset compensation and I/Q amplitude mismatch compensation may be performed on signals I and Q prior to providing them to the ADC 605. The baseband signals in a QCW radar after DC offset compensation can be written according to Equations 3 and 4:

$$I = A_{MM,I}\cos\left(\theta_{MM} + \frac{4\pi d}{\lambda}\right),\qquad\text{Eq. 3}$$

$$Q = A_{MM,Q}\sin\left(\theta_{MM} + \frac{4\pi d}{\lambda}\right),\qquad\text{Eq. 4}$$

where $A_{MM,I}$ is the amplitude of the in-phase signal I and $A_{MM,Q}$ is the amplitude of the quadrature signal Q. As can be appreciated, a dependency on distance d is present. The modulation caused by small variations of distance d (between transceiver/radar and metamaterial) is always superimposed with the modulation caused by the metamaterial. Thus, small variations in distance should be compensated. This compensation, performed by the DSP 606, can be done by implementing a reference measurement or a dual measurement. There are at least two possibilities for implementing the dual measurement. For them frequency multiplexing is applicable: (a) two-tone or dual tone QCW radar, and (b) a second QCW radar together with a second metamaterial array or a reference trace.

For a reference measurement, the transceiver 1100 is configured to transmit a first transmit signal SRF with a set frequency while the target metamaterial track(s) has/have a known rotational parameter (e.g., a known speed, direction, angle, or applied torque) and record the phase angle and/or absolute amplitude measurement per Equations 1 and 2 as reference values. For example, the metamaterial may be in a zero position as a reference position (e.g., zero speed, zero angle, zero torque). When performing a measurement on the rotational parameter, the transceiver 1100 is configured to transmit a second transmit signal SRF with the same frequency as the first transmit signal, obtain the I and Q signals, and, using the DSP 606, obtain the phase angle and/or the absolute amplitude measurement, calculate a difference between the measured value the corresponding reference value (i.e., the difference between the measured phase value and the reference phase value or the difference between the measured absolute amplitude and the reference absolute amplitude value), and determine a measurement value of the rotational parameter based on the measured difference. The, the DSP 606 determines the measurement value for the rotational parameter based on the measurement relative to the reference measurement.

As an example, the metamaterial track 43 is configured to generate a receive signal by changing a wave modulation property of a continuous wave based on a real-time value of the rotational parameter to be measured. The change of the wave modulation property is induced by a change in at least one of capacitive near field coupling, inductive near field coupling, waveguide coupling, or far field coupling corresponding to the real-time value of the rotational parameter. As a result, the metamaterial track 43 is configured to modify the continuous wave based on a real-time value of the rotational parameter to be measured as the measurement value, thereby producing the receive signal having a measured difference to the reference measurement that is unique to the real-time value of the rotational parameter.

Figure 12:
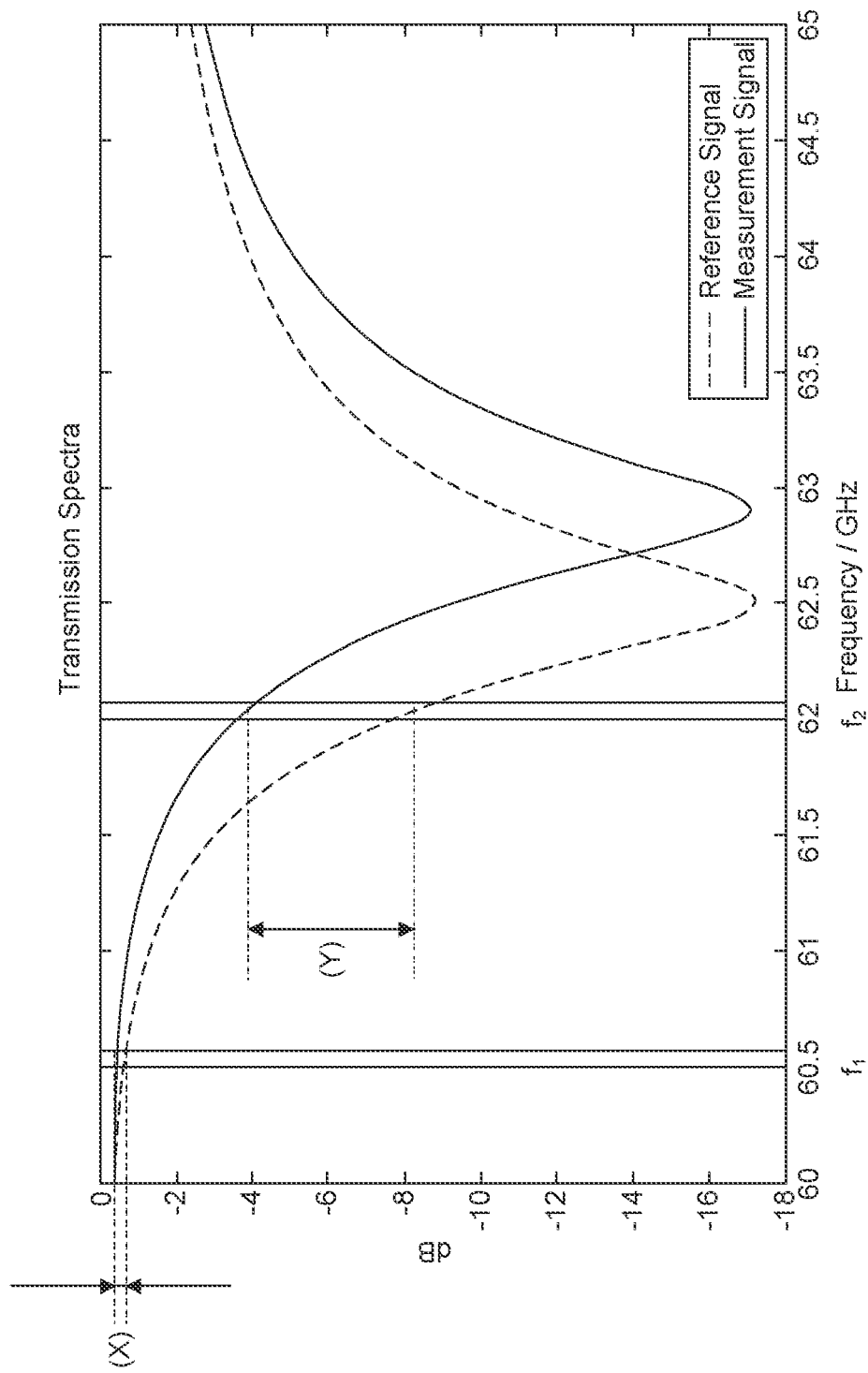
FIG. 12 illustrates an example transmission spectra from a metamaterial array or a mutually coupled pair of metamaterial arrays using two different transmission frequencies according to one or more embodiments.

To perform a more robust measurement against distance variations, two-tone or dual tone QCW radar may be used. The reference measurement is repeated using two different frequencies to obtain two reference values that are linked to their respective frequencies. This is implemented by measuring at two different frequencies on one metamaterial array, as illustrated in FIG. 12. FIG. 12 illustrates an example transmission spectra from a metamaterial array (e.g., track 43 or 44) or a mutually coupled pair of metamaterial arrays (e.g., tracks 55 and 56) over a frequency range. In other words, the transmission spectra is that of receive signals that have interacted with metamaterial. A reference signal is measured with a known rotational quantity being present (e.g., known rotational angle or torque) and a measurement signal is measured with an unknown rotational quantity to be determined by the transceiver 1100. In this example, measurement values are acquired at two different transmission frequencies f1 and f2 for amplitude measurement. Similar principles can be extended to a phase measurement.

Each transmitted signal SRF is a monochromatic continuous wave having a fixed frequency. Moreover, each metamaterial track or each mutually couple pair of metamaterial tracks has a resonance bandwidth. The first frequency f1 is outside the resonance bandwidth and the second frequency f2 is within the resonance bandwidth. As a result, signals transmitted with the first frequency f1 will experience a small influence from the metamaterial (i.e., a small phase or amplitude shift) and signals transmitted with the second frequency f2 will experience a large influence from the metamaterial (i.e., a large phase or amplitude shift). Accordingly, relative changes (X) and (Y) in the transmission spectra are different at frequencies f1 and f2 for a particular value of a rotational parameter. For example, for a particular rotational angle or a particular torque, difference values X and Y will be different.

To take a step back, the transceiver 1100 is configured to transmit a first transmit signal SRF with frequency f1 while the target metamaterial track(s) has/have a known rotational parameter (e.g., a known speed, direction, angle, or applied torque) and record the phase angle and/or absolute amplitude measurement per Equations 1 and 2 as first reference values. The transceiver 1100 is also configured to transmit a second transmit signal SRF with frequency f2 while the target metamaterial track(s) has/have a known rotational parameter (e.g., a known speed, direction, angle, or applied torque) and record the phase angle and/or absolute amplitude measurement per Equations 1 and 2 as second reference values. In this way, the DSP 606 obtains reference values at both frequencies f1 and f2. It will be appreciated that while two separate transmit signals with two different frequencies may be used via frequency multiplexing to acquire two sets of reference values, a two-tone signal or dual frequency signal could also be used to perform the measurements.

When performing a measurement on the rotational parameter, the transceiver 1100 is configured to transmit a third transmit signal SRF with frequency f1, obtain the I and Q signals, and, using the DSP 606, obtain the phase angle and/or the absolute amplitude measurement, calculate a first difference X between the measured value the corresponding reference value (i.e., the difference between the measured phase value and the reference phase value for frequency f1 or the difference between the measured absolute amplitude and the reference absolute amplitude value for frequency f1).

The transceiver 1100 is further configured to transmit a fourth transmit signal SRF with frequency f2, obtain the I and Q signals, and, using the DSP 606, obtain the phase angle and/or the absolute amplitude measurement, calculate a second difference Y between the measured value the corresponding reference value (i.e., the difference between the measured phase value and the reference phase value for frequency f2 or the difference between the measured absolute amplitude and the reference absolute amplitude value for frequency f2).

It will be appreciated that while two separate transmit signals with two different frequencies may be used to via frequency multiplexing to acquire two sets of measurement values, a two-tone signal or dual frequency signal could also be used to perform the measurements.

The DSP 606 is configured to calculate the phase angle and/or the absolute amplitude of the receive signal YRF based on the first difference and the second difference. Due to one frequency being within the resonance bandwidth of the metamaterial and one frequency being outside the resonance bandwidth, the relative changes in the transmission spectra are different at frequencies f1 and f2. The two difference values X and Y, in combination, are unique to a value of the measured rotational parameter. Thus, the DSP 606 may use, for example, a lookup table that references difference values X and Y to determine a measurement value of the rotational parameter. This dual reference measurement cancels out phase shifts from distance variations between the antenna and the metamaterial. Further, it compensates for path losses between the antennas and the metamaterial (e.g., dust, abrasions, humidity, etc.) as long as the reflected or transmitted waves are still detectable.

Regarding using a second QCW radar together with a second metamaterial array, two metamaterial arrays are designed such that a change in reflection or transmission is different between them. In other words, two metamaterial arrays may have different resonance bandwidths. For example, metamaterial tracks 43, 44, and 49 may have different resonance bandwidths, or reference track 55c or 56c may be implemented with a different resonance bandwidth, or mutually coupled pairs 55a/56c and 55b/56b may have different resonance bandwidths. The difference in modulation produced by tracks having different resonance bandwidths can be used to calculate the rotational parameter.

In this case, the transceiver 1101 may transmit a first transmission signal at, for example, frequency f1 that is inside the resonance bandwidth of a first metamaterial track and outside the resonance bandwidth of the second metamaterial track, and obtain the phase and/or amplitude measurement from each metamaterial track using the first transmission signal. The transceiver 1101 may the transmit a second transmission signal at, for example, frequency f2 that is inside the resonance bandwidth of the second metamaterial track and outside the resonance bandwidth of the first metamaterial track, and obtain the phase and/or amplitude measurement from each metamaterial track using the first transmission signal.

For a phase measurement, the DSP 606 is then configured to calculate a first phase difference between the phase measurements resultant from the first transmission signal transmitted at frequency f1, calculate a second phase difference between the phase measurements resultant from the second transmission signal transmitted at frequency f2, and determine the measurement value of the rotational parameter based on the first and the second differences. Read-out is done with two transceivers operating at different transmission frequencies or one transceiver varying between two frequencies. Time-multiplexing is also applicable.

For absolute amplitude measurement, the DSP 606 is then configured to calculate a first amplitude difference between the absolute amplitude measurements resultant from the first transmission signal transmitted at frequency f1, calculate a second amplitude difference between the absolute amplitude measurements resultant from the second transmission signal transmitted at frequency f2, and determine the measurement value of the rotational parameter based on the first and the second differences (e.g., by using a lookup table). Read-out is done with two transceivers operating at different transmission frequencies or one transceiver varying between two frequencies. Time-multiplexing is also applicable.

Regarding using a reference track, two tracks may be used with one being made of metamaterial and one being made without metamaterial (e.g., a bare metal track). This bare reference track may be used as a substitute to a track previously disclosed herein (e.g., track 43, 44, 49, 55c, or 56c). As a result of being void of metamaterial, the phase or amplitude modulation shift produced by the reference track is merely a function of path length d. Accordingly, the transceiver 1101 can transmit a first continuous wave at the metamaterial track that produces a receive signal from the first continuous wave transmit signal. The transceiver 1101 is configured to receive the receive signal and the DSP 606 is configured to acquire a measurement of the phase angle or absolute angle via I/Q modulation as a first measurement. Furthermore, the transceiver 1101 can transmit a second continuous wave at the reference track that produces a reference signal from the second continuous wave transmit signal. The transceiver 1101 is configured to receive the reference signal and the DSP 606 is configured to acquire a measurement of the phase angle or absolute angle of the reference signal via I/Q modulation and measure a path length d (substantially the same distance to the metamaterial track) based on the measurement. The DSP 606 can then use the distance measurement to perform compensation on the first measurement acquired from the targeted metamaterial to account to distance variations due to vibration or shock.

Additionally, or alternatively, the transceiver 1101 is configured to generate from the reference signal an in-phase demodulated signal and a quadrature demodulated signal, use the in-phase demodulated signal and the quadrature demodulated signal to derive a second measurement of the phase or absolute amplitude, and determine the measurement value for the rotational parameter based on the first and the second measurements. For example, a difference between the first and second measurements may be calculated by the DSP 606 and then used to determine the measurement value of the rotational parameter (e.g., via a lookup table).

Signal differentiation can be done in various ways. In the frequency space, different working frequencies of the metamaterial arrays are possible. Read-out is then done with two transceivers or one transceiver varying between two frequencies. Time-multiplexing is also applicable. It is also possible to differentiate between the signals by measuring at different positions of the disc and thereby avoid crosstalk between the receivers.

Additional embodiments are provided below.

1. A sensor system, comprising: a first metamaterial track mechanically coupled to a rotational shaft configured to rotate about a rotational axis, wherein the first metamaterial track is arranged at least partially around the rotational axis, and wherein the first metamaterial track comprises a first array of elementary structures; at least one transmitter configured to transmit a first continuous wave towards the first metamaterial track, wherein the first metamaterial track is configured to convert the first continuous wave into a first receive signal based on a rotational parameter of the rotational shaft; and at least one quadrature continuous-wave receiver configured to receive the first receive signal, acquire a first measurement of a first property of the first receive signal, and determine a measurement value for the rotational parameter of the rotational shaft based on the first measurement.

2. The sensor system of embodiment 1, further comprising: a second metamaterial track mechanically coupled to the rotational axis, wherein the second metamaterial track is arranged at least partially around of the rotational axis, and wherein the second metamaterial track comprises a second array of elementary structures, wherein the at least one is transmitter configured to transmit the first continuous wave towards the second metamaterial track, wherein the first and the second metamaterial tracks are configured, together, to convert the first continuous wave into the first receive signal based on the rotational parameter of the rotational shaft; and the at least one quadrature continuous-wave receiver is configured to receive the first receive signal, acquire the first measurement of the first property of the first receive signal, and determine the measurement value for the rotational parameter of the rotational shaft based on the first measurement.

3. The sensor system of embodiment 1, wherein: the at least one quadrature continuous-wave receiver is configured to evaluate the first measurement relative to a first reference measurement that corresponds to the rotational parameter, and determine the measurement value for the rotational parameter based on the first measurement relative to the first reference measurement.

4. The sensor system of embodiment 1, wherein the at least one quadrature continuous-wave receiver includes at least one processor configured to evaluate the first property using at least one of phase analysis, amplitude analysis, or spectral analysis, and determine the measurement value for the rotational parameter based on the evaluated first property.

5. The sensor system of embodiment 1, wherein the at least one quadrature continuous-wave receiver is configured to generate from the first receive signal a first in-phase demodulated signal and a first quadrature demodulated signal, use the first in-phase demodulated signal and the first quadrature demodulated signal to derive the first measurement, and determine the measurement value for the rotational parameter based on the first measurement.

6. The sensor system of embodiment 5, wherein the first property is an amplitude of the first receive signal and the at least one quadrature continuous-wave receiver is configured to calculate the first measurement of the first property of the first receive signal according to: Equation 2, wherein A denotes the first measurement, I denotes a DC value of the first in-phase demodulated signal, Q denotes a DC value of the first quadrature demodulated signal, and sqrt denotes a square root function.

7. The sensor system of embodiment 5, wherein the first property is a phase of the first receive signal and the at least one quadrature continuous-wave receiver is configured to calculate the first measurement of the first property of the first receive signal according to Equation 1, wherein ϕ denotes the first measurement, I denotes a DC value of the first in-phase demodulated signal, and Q denotes a DC value of the first quadrature demodulated signal.

8. The sensor system of embodiment 5, wherein the at least one quadrature continuous-wave receiver is configured to evaluate the first measurement relative to a first reference measurement that corresponds to the rotational parameter and determine the measurement value of the rotational parameter based on the first measurement relative to the first reference measurement.

9. The sensor system of embodiment 5, wherein the at least one quadrature continuous-wave receiver is configured to calculate a difference between the first measurement and the first reference measurement, and determine measurement value of the rotational parameter of the rotational shaft based on the difference.

10. The sensor system of embodiment 8, wherein the first reference measurement is a reference amplitude or a reference phase that correspond to a reference value of the rotational parameter.

11. The sensor system of embodiment 1, wherein: the at least one transmitter is configured to transmit a second continuous wave towards the first metamaterial track, wherein the first continuous wave is a monochromatic wave having a first frequency and the second continuous wave is a monochromatic wave having a second frequency different from the first frequency, the first metamaterial track is configured to convert the second continuous wave into a second receive signal based on the rotational parameter of the rotational shaft, and the at least one quadrature continuous-wave receiver is configured to receive the second receive signal, acquire a second measurement of the second receive signal, and determine the rotational parameter based on the first measurement and the second measurement.

12. The sensor system of embodiment 11, wherein: the at least one quadrature continuous-wave receiver is configured to evaluate the first measurement relative to a first reference measurement acquired at the first frequency and that corresponds to the rotational parameter, evaluate the second measurement relative to a second reference measurement acquired at the second frequency and that corresponds to the rotational parameter, and the at least one quadrature continuous-wave receiver is configured to determine a first difference between the first measurement and the first reference measurement, determine a second difference between the second measurement and the second reference measurement, and determine measurement value of the rotational parameter of the rotational shaft based on the first difference and the second difference.

13. The sensor system of embodiment 11, wherein the first metamaterial track has a resonance bandwidth, and the first frequency is within the resonance bandwidth and the second frequency is outside the resonance bandwidth.

14. The sensor system of embodiment 1, wherein the first metamaterial track is configured to generate the first receive signal by changing a wave modulation property of the first continuous wave based on a real-time value of the rotational parameter to be measured, wherein the change of the wave modulation property is induced by a change in at least one of capacitive near field coupling, inductive near field coupling, waveguide coupling, or far field coupling corresponding to the real-time value of the rotational parameter.

15. The sensor system of embodiment 1, wherein: the metamaterial track is configured to modify the first continuous wave based on a real-time value of the rotational parameter to be measured as the measurement value, thereby producing the first receive signal having the first measurement unique to the real-time value of the rotational parameter.

16. The sensor system of embodiment 1, further comprising: a reference track mechanically coupled to the rotational axis and arranged at least partially around the rotational axis, and wherein the reference track is void of metamaterial, wherein the at least one transmitter is configured to transmit a second continuous wave at the reference track that produces a reference signal from the second continuous wave, wherein the at least one quadrature continuous-wave receiver is configured to receive the reference signal, acquire a second measurement of the first property from the reference signal, and measure a distance to the first metamaterial track based on the second measurement.

17. The sensor system of embodiment 16, wherein the at least one quadrature continuous-wave receiver is configured to generate from the reference signal an in-phase demodulated signal and a quadrature demodulated signal, use the in-phase demodulated signal and the quadrature demodulated signal to derive the second measurement, and determine the measurement value for the rotational parameter based on the first and the second measurements.

18. The sensor system of embodiment 1, further comprising: a reference track mechanically coupled to the rotational axis and arranged at least partially around the rotational axis, wherein the at least one transmitter is configured to transmit the first continuous wave at the reference track that is configured to produce a reference signal from the first continuous wave, wherein the at least one quadrature continuous-wave receiver is configured to generate from the reference signal a reference in-phase demodulated signal and a reference quadrature demodulated signal, use the reference in-phase demodulated signal and the reference quadrature demodulated signal to derive a second measurement of the first property from the reference signal, and determine the measurement value for the rotational parameter based on the first and the second measurements.

19. The sensor system of embodiment 1, further comprising: further comprising a reference track mechanically coupled to the rotational axis and arranged at least partially around the rotational axis, wherein the at least one transmitter is configured to transmit a second continuous wave at the reference track that is configured to produce a reference signal from the second continuous wave, wherein the at least one quadrature continuous-wave receiver is configured to generate from the reference signal a reference in-phase demodulated signal and a reference quadrature demodulated signal, use the reference in-phase demodulated signal and the reference quadrature demodulated signal to derive a second measurement of the first property from the reference signal, and determine the measurement value for the rotational parameter based on the first and the second measurements.

20. The sensor system of embodiment 19, wherein the first continuous wave is a monochromatic wave having a first frequency and the second continuous wave is a monochromatic wave having a second frequency different from the first frequency.

21. The sensor system of embodiment 20, wherein: the first metamaterial track has a first resonance bandwidth, and the first frequency is within the first resonance bandwidth and the second frequency is outside the first resonance bandwidth, and the reference track is made of metamaterial and has a second resonance bandwidth, and the first frequency is outside the second resonance bandwidth and the second frequency is inside the second resonance bandwidth.

22. The sensor system of embodiment 19, wherein: the first and the second continuous waves are monochromatic waves having a same frequency, and the at least one quadrature continuous-wave receiver is configured to calculate a difference between the first measurement and the second measurement, and determine measurement value of the rotational parameter of the rotational shaft based on the difference.

23. The sensor system of embodiment 22, the first metamaterial track has a first resonance bandwidth and the second metamaterial track has a second resonance bandwidth different from the first resonance bandwidth.

24. A method of determining a rotational parameter of a rotatable shaft, the method comprising: transmitting a first continuous wave towards a first metamaterial track mechanically coupled to the rotatable shaft; converting, by the first metamaterial track, the first continuous wave into a first receive signal based on a real-time value of the rotational parameter; receiving, by a quadrature continuous-wave receiver, the first receive signal; acquiring, by the quadrature continuous-wave receiver, a first measurement of a first property of the first receive signal; and determining, by the quadrature continuous-wave receiver, determine the real-time value of the rotational parameter of the rotational shaft based on the first measurement.

25. A rotation sensor system, comprising: a rotational shaft configured to rotate about a rotational axis; a first array of millimeter-wave (mm-wave) structures mechanically coupled to the rotational shaft, wherein the first array of mm-wave structures is arranged at least partially around the rotational axis, and wherein the first array of mm-wave structures has a first working resonance frequency; a second array of mm-wave structures mechanically coupled to the rotational shaft, wherein the second array of mm-wave structures is arranged at least partially around the rotational axis, and wherein the second array of mm-wave structures has a second working resonance frequency that is different from the first working resonance frequency; at least one transmitter configured to transmit a first electro-magnetic transmit signal towards the first array of mm-wave structures and transmit a second electro-magnetic transmit signal towards the second array of mm-wave structures, wherein the first array of mm-wave structures is configured to convert the first electro-magnetic transmit signal into a first electro-magnetic receive signal, wherein the second array of mm-wave structures is configured to convert the second electro-magnetic transmit signal into a second electro-magnetic receive signal; and at least one receiver configured to receive the first electro-magnetic receive signal and the second electro-magnetic receive signal, determine a first rotational parameter of the rotational shaft based on the first electro-magnetic receive signal, and determine a second rotational parameter of the rotational shaft based on the second electro-magnetic receive signal, wherein the first rotational parameter and the second rotational parameter are different rotational parameters.

26. The rotation sensor system of embodiment 25, wherein: the first rotational parameter is a rotational speed of the rotational shaft, an absolute angular position of the rotational shaft, a rotation direction of the rotational shaft, or a torque applied to the rotational shaft, and the second rotational parameter is the rotational speed of the rotational shaft, the absolute angular position of the rotational shaft, the rotation direction of the rotational shaft, or the torque applied to the rotational shaft.

27. The rotation sensor system of embodiment 25, wherein the first array of mm-wave structures has at least one characteristic that changes along a length of the first array of mm-wave structures such that a single period of characteristic change is encoded along the length of the first array of mm-wave structures.

28. The rotation sensor system of embodiment 25, wherein the first array of mm-wave structures is spatially separated from the second array of mm-wave structures.

29. The rotation sensor system of embodiment 25, wherein the first array of mm-wave structures and the second array of mm-wave structures are spatially intermixed.

30. The rotation sensor system of embodiment 25, further comprising: a third array of mm-wave structures mechanically coupled to the rotational shaft, wherein the third array of mm-wave structures is arranged at least partially around the rotational axis, and wherein the third array of mm-wave structures has a third working resonance frequency that is different from the first and the second working resonance frequencies; wherein the at least one transmitter is configured to transmit a third electro-magnetic transmit signal towards the third array of mm-wave structures, wherein the third array of mm-wave structures is configured to convert the third electro-magnetic transmit signal into a third electro-magnetic receive signal; and wherein the at least one receiver is configured to receive the third electro-magnetic receive signal, and determine a third rotational parameter of the rotational shaft based on the third electro-magnetic receive signal, wherein the third rotational parameter is different from the first and the second rotational parameters.

31. The rotation sensor system of embodiment 25, further comprising: a third array of mm-wave structures mechanically coupled to the rotational shaft, wherein the third array of mm-wave structures is arranged at least partially around the rotational axis, and wherein the third array of mm-wave structures has a third working resonance frequency that is different from the first and the second working resonance frequencies; wherein the at least one transmitter is configured to transmit a third electro-magnetic transmit signal towards the third array of mm-wave structures, wherein the third array of mm-wave structures are configured to convert the third electro-magnetic transmit signal into a third electro-magnetic receive signal; and wherein the at least one receiver is configured to receive the third electro-magnetic receive signal, and determine the second rotational parameter of the rotational shaft based on second the and the third electro-magnetic receive signals, wherein the second rotational parameter is the rotation direction.

32. The rotation sensor system of embodiment 25, further comprising: a third array of mm-wave structures mechanically coupled to the rotatable shaft, wherein the third array of mm-wave structures is arranged at least partially around the rotational axis, and wherein the third array of mm-wave structures has the first working resonance frequency, wherein the first array of mm-wave structures and the third array of mm-wave structures are mutually coupled to each other by a torque dependent coupling, thereby forming a mutually coupled structure that is sensitive to a torque dependent angular shift between the first array of mm-wave structures and the third array of mm-wave structures, wherein the mutually coupled structure is configured to convert the first electro-magnetic transmit signal into the first electro-magnetic receive signal based on a torque applied to the rotational shaft that causes the torque dependent angular shift, the torque applied to the rotational shaft being the first rotational parameter of the rotational shaft.

33. The rotation sensor system of embodiment 25, wherein a bandwidth of the second working resonance frequency does not overlap with a bandwidth of the first working resonance frequency.

34. The rotation sensor system of embodiment 33, wherein the first electro-magnetic transmit signal has a first frequency bandwidth that overlaps with the bandwidth of the first working resonance frequency but not with the bandwidth of the second working resonance frequency, and the second electro-magnetic transmit signal has a second frequency bandwidth that overlaps with the bandwidth of the second working resonance frequency but not with the bandwidth of the first working resonance frequency.

35. A rotation sensor system, comprising: a rotational shaft configured to rotate about a rotational axis; a first array of millimeter-wave (mm-wave) structures mechanically coupled to the rotational shaft, wherein the first array of mm-wave structures is arranged at least partially around the rotational axis, and wherein the first array of mm-wave structures has a first working resonance frequency; a second array of mm-wave structures mechanically coupled to the rotational shaft, wherein the second array of mm-wave structures is arranged at least partially around the rotational axis, and wherein the second array of mm-wave structures has a second working resonance frequency that is different from the first working resonance frequency; a transmitter configured to transmit an electro-magnetic transmit signal towards the first array of mm-wave structures and the second array of mm-wave structures, wherein the first array of mm-wave structures is configured to convert the electro-magnetic transmit signal into a first electro-magnetic receive signal and the second array of mm-wave structures is configured to convert the electro-magnetic transmit signal into a second electro-magnetic receive signal; and at least one receiver configured to receive the first electro-magnetic receive signal and the second electro-magnetic receive signal, determine a first rotational parameter of the rotational shaft based on the first electro-magnetic receive signal, and determine a second rotational parameter of the rotational shaft based on the second electro-magnetic receive signal, wherein the first rotational parameter and the second rotational parameter are different rotational parameters.

36. A linear movement sensor system, comprising: a linear movable target object configured to move linearly in a linear moving direction; a first array of millimeter-wave (mm-wave) structures coupled to the linear movable target object, wherein the first array of mm-wave structures extends along the linear moving direction, and wherein the first array of mm-wave structures has a first working resonance frequency; a second array of mm-wave structures coupled to the linear movable target object, wherein the second array of mm-wave structures extends along the linear moving direction, and wherein the second array of mm-wave structures has a second working resonance frequency that is different from the first working resonance frequency; at least one transmitter configured to transmit at least one electro-magnetic transmit signal towards the first array of mm-wave structures and the second array of mm-wave structures, wherein the first array of mm-wave structures is configured to convert one of the at least one electro-magnetic transmit signal into a first electro-magnetic receive signal and the second array of mm-wave structures is configured to convert one of the at least one electro-magnetic transmit signal into a second electro-magnetic receive signal; and at least one receiver configured to receive the first and the second electro-magnetic receive signals, determine a first linear movement parameter of the linear movable target object based on the first electro-magnetic receive signal, and determine a second linear movement parameter of the linear movable target object based on the second electro-magnetic receive signal, wherein the first linear movement parameter and the second linear movement parameter are different linear movement parameters.

37. The linear position sensor system of embodiment 36, wherein: the first linear movement parameter is a linear speed, a movement direction, or an absolute linear position of the linear movable target object, and the second linear movement parameter is the linear speed, the movement direction, or the absolute linear position of the linear movable target object.

While various embodiments have been disclosed, it will be apparent to those skilled in the art that various changes and modifications can be made which will achieve some of the advantages of the concepts disclosed herein without departing from the spirit and scope of the invention. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein. Thus, it will be obvious to those reasonably skilled in the art that other components performing the same functions may be suitably substituted Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent on the independent claim.

It is further to be noted that methods disclosed in the specification or in the claims may be implemented by a device having means for performing each of the respective acts of these methods. For example, the techniques described in this disclosure may be implemented, at least in part, in hardware, software, firmware, or any combination thereof, including any combination of a computing system, an integrated circuit, and a computer program on a non-transitory computer-readable recording medium. For example, various aspects of the described techniques may be implemented within one or more processors, including one or more microprocessors, DSPs, ASICs, or any other equivalent integrated or discrete logic circuitry, as well as any combinations of such components.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments, a single act may include or may be broken into multiple sub acts. Such sub acts may be included and part of the disclosure of this single act unless explicitly excluded.

What is claimed is:

1. A sensor system, comprising:
a first metamaterial track mechanically coupled to a rotational shaft configured to rotate about a rotational axis, wherein the first metamaterial track is arranged at least partially around the rotational axis, and wherein the first metamaterial track comprises a first array of elementary structures;
at least one transmitter configured to transmit a first continuous wave towards the first metamaterial track, wherein the first metamaterial track is configured to convert the first continuous wave into a first receive signal based on a rotational parameter of the rotational shaft; and
at least one quadrature continuous-wave receiver configured to receive the first receive signal, acquire a first measurement of a first property of the first receive signal, and determine a measurement value for the rotational parameter of the rotational shaft based on the first measurement.

2. The sensor system of claim 1, further comprising:
a second metamaterial track mechanically coupled to the rotational axis, wherein the second metamaterial track is arranged at least partially around the rotational axis, and wherein the second metamaterial track comprises a second array of elementary structures,
wherein the at least one is transmitter configured to transmit the first continuous wave towards the second metamaterial track, wherein the first and the second metamaterial tracks are configured, together, to convert the first continuous wave into the first receive signal based on the rotational parameter of the rotational shaft; and
the at least one quadrature continuous-wave receiver is configured to receive the first receive signal, acquire the first measurement of the first property of the first receive signal, and determine the measurement value for the rotational parameter of the rotational shaft based on the first measurement.

3. The sensor system of claim 1, wherein:
the at least one quadrature continuous-wave receiver is configured to evaluate the first measurement relative to a first reference measurement that corresponds to the rotational parameter, and determine the measurement value for the rotational parameter based on the first measurement relative to the first reference measurement.

4. The sensor system of claim 1, wherein the at least one quadrature continuous-wave receiver includes at least one processor configured to evaluate the first property using at least one of phase analysis, amplitude analysis, or spectral analysis, and determine the measurement value for the rotational parameter based on the evaluated first property.

5. The sensor system of claim 1, wherein the at least one quadrature continuous-wave receiver is configured to generate from the first receive signal a first in-phase demodulated signal and a first quadrature demodulated signal, use the first in-phase demodulated signal and the first quadrature demodulated signal to derive the first measurement, and determine the measurement value for the rotational parameter based on the first measurement.

6. The sensor system of claim 5, wherein the first property is an amplitude of the first receive signal and the at least one quadrature continuous-wave receiver is configured to calculate the first measurement of the first property of the first receive signal according to:

$A = \mathrm{sqrt}(I^2 + Q^2)$, wherein A denotes the first measurement, I denotes a DC value of the first in-phase demodulated signal, Q denotes a DC value of the first quadrature demodulated signal, and sqrt denotes a square root function.

7. The sensor system of claim 5, wherein the first property is a phase of the first receive signal and the at least one quadrature continuous-wave receiver is configured to calculate the first measurement of the first property of the first receive signal according to:

$$\phi = \tan^{-1}\frac{I}{Q}$$

wherein $\phi$ denotes the first measurement, I denotes a DC value of the first in-phase demodulated signal, and Q denotes a DC value of the first quadrature demodulated signal.

8. The sensor system of claim 5, wherein the at least one quadrature continuous-wave receiver is configured to evaluate the first measurement relative to a first reference measurement that corresponds to the rotational parameter and determine the measurement value of the rotational parameter based on the first measurement relative to the first reference measurement.

9. The sensor system of claim 8, wherein the first reference measurement is a reference amplitude or a reference phase that correspond to a reference value of the rotational parameter.

10. The sensor system of claim 8, wherein the at least one quadrature continuous-wave receiver is configured to calculate a difference between the first measurement and the first reference measurement, and determine measurement value of the rotational parameter of the rotational shaft based on the difference.

11. The sensor system of claim 1, wherein:
the at least one transmitter is configured to transmit a second continuous wave towards the first metamaterial track, wherein the first continuous wave is a monochromatic wave having a first frequency and the second continuous wave is a monochromatic wave having a second frequency different from the first frequency,
the first metamaterial track is configured to convert the second continuous wave into a second receive signal based on the rotational parameter of the rotational shaft, and the at least one quadrature continuous-wave receiver is configured to receive the second receive signal, acquire a second measurement of the second receive signal, and determine the rotational parameter based on the first measurement and the second measurement.

12. The sensor system of claim 11, wherein:
the at least one quadrature continuous-wave receiver is configured to evaluate the first measurement relative to a first reference measurement acquired at the first frequency and that corresponds to the rotational parameter, evaluate the second measurement relative to a second reference measurement acquired at the second frequency and that corresponds to the rotational parameter, and
the at least one quadrature continuous-wave receiver is configured to determine a first difference between the first measurement and the first reference measurement, determine a second difference between the second measurement and the second reference measurement, and determine measurement value of the rotational parameter of the rotational shaft based on the first difference and the second difference.

13. The sensor system of claim 11, wherein the first metamaterial track has a resonance bandwidth, and the first frequency is within the resonance bandwidth and the second frequency is outside the resonance bandwidth.

14. The sensor system of claim 1, wherein the first metamaterial track is configured to generate the first receive signal by changing a wave modulation property of the first continuous wave based on a real-time value of the rotational parameter to be measured, wherein the change of the wave modulation property is induced by a change in at least one of capacitive near field coupling, inductive near field coupling, waveguide coupling, or far field coupling corresponding to the real-time value of the rotational parameter.

15. The sensor system of claim 1, wherein:
the metamaterial track is configured to modify the first continuous wave based on a real-time value of the rotational parameter to be measured as the measurement value, thereby producing the first receive signal having the first measurement unique to the real-time value of the rotational parameter.

16. The sensor system of claim 1, further comprising:
a reference track mechanically coupled to the rotational axis and arranged at least partially around the rotational axis, and wherein the reference track is void of metamaterial,
wherein the at least one transmitter is configured to transmit a second continuous wave at the reference track that produces a reference signal from the second continuous wave,
wherein the at least one quadrature continuous-wave receiver is configured to receive the reference signal, acquire a second measurement of the first property from the reference signal, and measure a distance to the first metamaterial track based on the second measurement.

17. The sensor system of claim 16, wherein the at least one quadrature continuous-wave receiver is configured to generate from the reference signal an in-phase demodulated signal and a quadrature demodulated signal, use the in-phase demodulated signal and the quadrature demodulated signal to derive the second measurement, and determine the measurement value for the rotational parameter based on the first and the second measurements.

18. The sensor system of claim 1, further comprising:
a reference track mechanically coupled to the rotational axis and arranged at least partially around the rotational axis,
wherein the at least one transmitter is configured to transmit the first continuous wave at the reference track that is configured to produce a reference signal from the first continuous wave,
wherein the at least one quadrature continuous-wave receiver is configured to generate from the reference signal a reference in-phase demodulated signal and a reference quadrature demodulated signal, use the reference in-phase demodulated signal and the reference quadrature demodulated signal to derive a second measurement of the first property from the reference signal, and determine the measurement value for the rotational parameter based on the first and the second measurements.

19. The sensor system of claim 1, further comprising:
further comprising a reference track mechanically coupled to the rotational axis and arranged at least partially around the rotational axis,
wherein the at least one transmitter is configured to transmit a second continuous wave at the reference track that is configured to produce a reference signal from the second continuous wave,
wherein the at least one quadrature continuous-wave receiver is configured to generate from the reference signal a reference in-phase demodulated signal and a reference quadrature demodulated signal, use the reference in-phase demodulated signal and the reference quadrature demodulated signal to derive a second measurement of the first property from the reference signal, and determine the measurement value for the rotational parameter based on the first and the second measurements.

20. The sensor system of claim 19, wherein the first continuous wave is a monochromatic wave having a first frequency and the second continuous wave is a monochromatic wave having a second frequency different from the first frequency.

21. The sensor system of claim 20, wherein:
the first metamaterial track has a first resonance bandwidth, and the first frequency is within the first resonance bandwidth and the second frequency is outside the first resonance bandwidth, and
the reference track is made of metamaterial and has a second resonance bandwidth, and the first frequency is outside the second resonance bandwidth and the second frequency is inside the second resonance bandwidth.

22. The sensor system of claim 19, wherein:
the first and the second continuous waves are monochromatic waves having a same frequency, and
the at least one quadrature continuous-wave receiver is configured to calculate a difference between the first measurement and the second measurement, and determine measurement value of the rotational parameter of the rotational shaft based on the difference.

23. The sensor system of claim 2, wherein the first metamaterial track has a first resonance bandwidth and the second metamaterial track has a second resonance bandwidth different from the first resonance bandwidth.

24. A method of determining a rotational parameter of a rotatable shaft, the method comprising:
transmitting a first continuous wave towards a first metamaterial track mechanically coupled to the rotatable shaft;

converting, by the first metamaterial track, the first continuous wave into a first receive signal based on a real-time value of the rotational parameter;

receiving, by a quadrature continuous-wave receiver, the first receive signal;

acquiring, by the quadrature continuous-wave receiver, a first measurement of a first property of the first receive signal; and determining, by the quadrature continuous-wave receiver, determine the real-time value of the rotational parameter of the rotational shaft based on the first measurement.

* * * * *